(12) United States Patent
Cho

(10) Patent No.: US 9,952,313 B2
(45) Date of Patent: Apr. 24, 2018

(54) PHASE CALIBRATION OF A STEPPED-CHIRP SIGNAL FOR A SYNTHETIC APERTURE RADAR

(71) Applicant: The Boeing Company, Seal Beach, CA (US)

(72) Inventor: Kwang M. Cho, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 493 days.

(21) Appl. No.: 14/491,354

(22) Filed: Sep. 19, 2014

(65) Prior Publication Data

US 2017/0016979 A1 Jan. 19, 2017

(51) Int. Cl.
*G01S 13/90* (2006.01)
*G01S 7/40* (2006.01)
G01S 13/28 (2006.01)
G01S 13/30 (2006.01)

(52) U.S. Cl.
CPC ............ *G01S 7/4004* (2013.01); *G01S 13/90* (2013.01); *G01S 13/282* (2013.01); *G01S 13/30* (2013.01)

(58) Field of Classification Search
CPC ........ G01S 7/4004; G01S 13/90; G01S 13/30; G01S 13/282
USPC .......... 342/25 A, 25 R, 25 B–25 F, 173–174, 342/194–196
See application file for complete search history.

(56) References Cited

U.S. PATENT DOCUMENTS

| | | | |
|---|---|---|---|
| 4,924,229 A | 5/1990 | Eichel et al. | |
| 4,999,635 A | 3/1991 | Niho | |
| 5,160,933 A * | 11/1992 | Hager | G01S 7/4052 342/120 |
| 5,248,976 A | 9/1993 | Niho et al. | |
| 5,315,620 A * | 5/1994 | Halawani | H03D 1/2245 329/304 |
| 5,412,414 A * | 5/1995 | Ast | H01Q 21/0025 342/174 |
| 5,831,570 A * | 11/1998 | Ammar | F41G 7/2226 342/149 |
| 6,144,333 A * | 11/2000 | Cho | G01S 7/4021 342/149 |
| 7,570,201 B1 * | 8/2009 | Watkins | G01S 7/4008 342/100 |

(Continued)

FOREIGN PATENT DOCUMENTS

EP 2998763 A1 * 3/2016 ........... G01S 7/4004

OTHER PUBLICATIONS

Xinhua Mao, Daiyin Zhu, Zhaoda Zhu, An Overlapped Subaperture Polar Format Algorithm Based on Sub-chirp Signals, Department of Electronic Engineering, Nanjing University of Aeronautics and Astronautics, Nanjing, 210016, China, xinhua@nuaa.edu.cn.

(Continued)

*Primary Examiner* — John B Sotomayor
(74) *Attorney, Agent, or Firm* — Francisco A. Rubio-Campos; Apogee Law Group P.C.

(57) ABSTRACT

A Radar Calibration Processor ("RCP") for calibrating the phase of a stepped-chirp signal utilized by a synthetic aperture radar ("SAR") is disclosed. The RCP includes a periodic phase error ("PPE") calibrator, first non-periodic phase error ("NPPE") calibrator in signal communication with the PPE calibrator, and a second NPPE calibrator in signal communication with the first NPPE calibrator.

23 Claims, 20 Drawing Sheets

(56) References Cited

U.S. PATENT DOCUMENTS

| | | | |
|---|---|---|---|
| 7,728,757 B2 | 6/2010 | Cho | |
| 7,898,344 B2 * | 3/2011 | Hongo | G01S 7/023 327/156 |
| 7,999,724 B2 * | 8/2011 | Cho | G01S 7/40 342/25 A |
| 9,110,167 B2 | 8/2015 | Cho | |
| 2005/0003785 A1 * | 1/2005 | Jackson | G01S 7/35 455/260 |
| 2017/0016979 A1 * | 1/2017 | Cho | G01S 7/4004 |

OTHER PUBLICATIONS

Feng Zhu, Ying Luo, Qun Zhang, You-Qian Feng, You-Qing Bai, ISAR Imaging for Avian Species Identification With Frequency-Stepped Chirp Signals, IEEE Geoscience and Remote Sensing Letters, vol. 7, No. 1, Jan. 2010.

Song Yue Peng, Yang Ru Liang, Wideband Signal Forming by Stepped Chirp and Phase Error Analysis, Institute of Electronics, Chinese Academy of Sciences, Beijing 100080, China; Graduate University Chinese Academy of Sciences, Beijing 100039, China. China Academic Journal Electronic Publishing House 1994-2015 www.cnki.net.

European Intellectual Property Office Communication European Search Report, Application No. 15184601.1, dated Jan. 26, 2016.

* cited by examiner

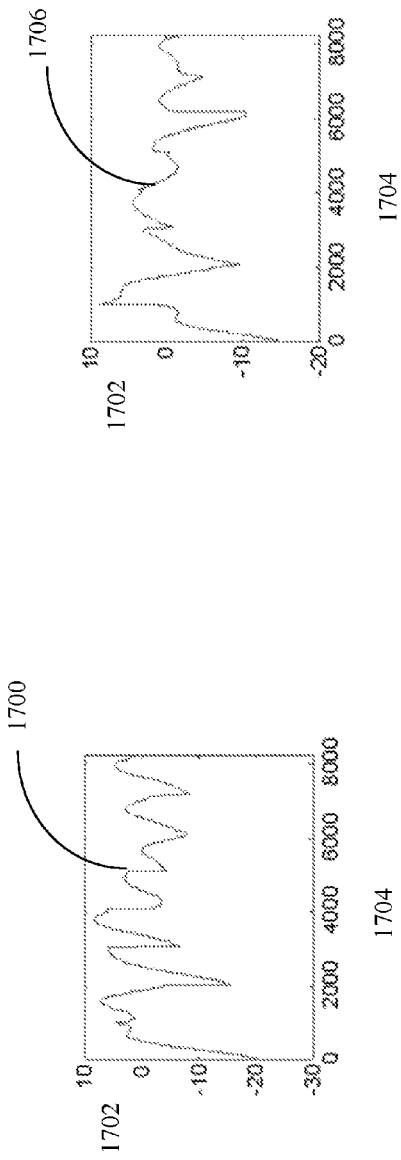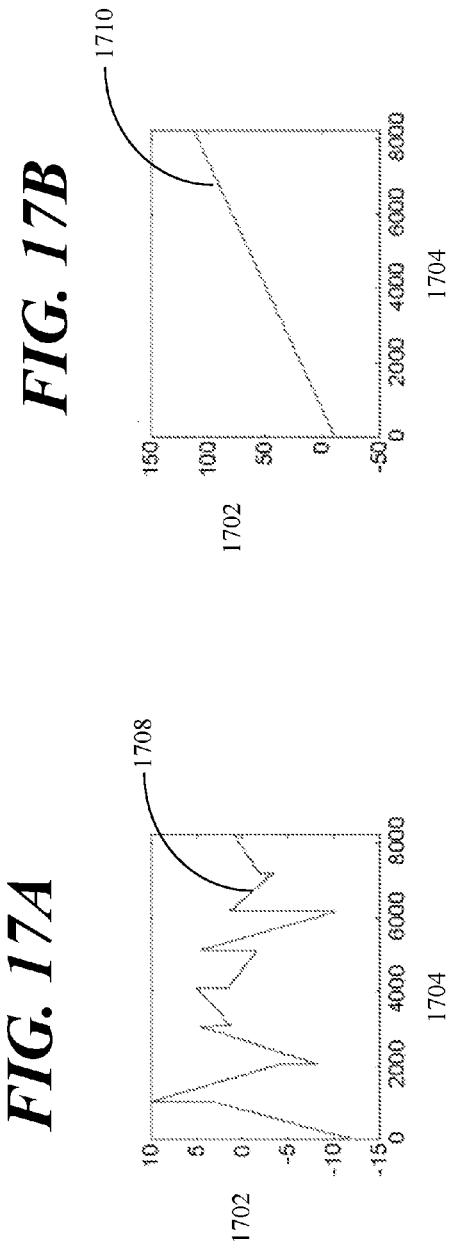
FIG. 17A  FIG. 17B  FIG. 17C  FIG. 17D

PHASE CALIBRATION OF A STEPPED-CHIRP SIGNAL FOR A SYNTHETIC APERTURE RADAR

STATEMENT REGARDING FEDERALLY SPONSORED RESEARCH AND DEVELOPMENT

This invention was made with United States Government ("USG") support. The government has certain rights in the invention.

CROSS-REFERENCE TO RELATED APPLICATIONS

This application is related to U.S. patent application Ser. No. 14/491,291, titled "AMPLITUDE CALIBRATION OF A STEPPED-CHIRP SIGNAL FOR A SYNTHETIC APERTURE RADAR," filed on Sep. 19, 2014, to inventors Kwang M. Cho and Kenneth W. Conte, which is herein incorporated by reference in its entirety.

BACKGROUND OF THE INVENTION

1. Field of the Invention

The present disclosure is generally related to radar systems and more specifically to correcting errors in Synthetic Aperture Radar ("SAR") data.

2. Related Art

Radar has long been used for military and non-military purposes in a wide variety of applications such as imaging, guidance, remote sensing and global positioning. A Synthetic Aperture Radar ("SAR") is a coherent mostly airborne or spaceborne side-looking radar system ("SLAR") which utilizes the flight path of a moving platform (i.e., a vehicle such as, for example an aircraft or satellite), on which the SAR is located, to simulate an extremely large antenna or aperture electronically, and that generates high-resolution remote sensing imagery. Specifically, a SAR is used for terrain mapping and/or remote sensing using a relatively small antenna installed on the moving platform in the air.

The fact that a SAR may utilize a small antenna is a major advantage over a SLAR because the beamwidth of the radiation pattern of an antenna (generally known as the "antenna beamwidth") is inversely proportional to the dimension of antenna aperture and, in general, the more narrow the antenna beamwidth, the higher the potential resolution of a scanned image of a target area. As such, the image of the target area formed by a SLAR is poor in azimuth resolution because the azimuth antenna beamwidth has an angular resolution that is too broad to differentiate between fine details at the same range within the target area. Therefore for an SLAR, either an extremely large antenna or very high frequency of operation (where the wavelengths are so short that the radar must content with the effects of severe attenuation in the atmosphere) needs to be utilized to produce high resolution images of target areas for direct terrain mapping and/or remote sensing, which is unrealistic for a radar system installed on a moving platform.

SAR solves the problems associated with SLAR by utilizing a smaller antenna and signal processing. Unlike a SLAR, a SAR is able to achieve the same effect of a large antenna by transmitting an array of pulses using a small aperture antenna and coherently processing the resulting data reflected from the terrain for all transmitted pulses. In general, SAR is a technique that utilizes signal processing to improve the resolution beyond the limitation of the physical antenna aperture on the platform where the forward motion of actual antenna is used to 'synthesize' a very long antenna. As such, SAR allows the possibility of using longer wavelengths and still achieving good resolution with antennas that have structures of reasonable size.

In an example of operation, the SAR moves with the platform along a flight path over a target and transmits successive pulses of radio waves to illuminate a target scene, receives and records the echo (i.e., the radar return signal) of each pulse, and then generates a high-resolution image of the target scene from processing the received echo pulses. In this way, the SAR works similar to a phased array system, but contrary of a large number of the parallel antenna elements of a phased array, the SAR uses one antenna in time-multiplex. As such, the different geometric positions of the antenna of the SAR, as a result of moving the platform, simulate the antenna elements of a phased array.

The SAR transmits the pulses at pulse repetition frequency ("PRF") rate, which represents the number of pulses that are transmitted by the SAR per second. The reciprocal of PRF is also known as the pulse collection period or inter-pulse period. Each pulse is radiated (i.e., transmitted) at the carrier frequency of operation of the SAR during a transmit time (generally referred to as the pulse with ("PW")). The SAR then waits for the returning echoes (i.e., the radar return signals) during a listening, or rest, time and then radiates the next pulse. The time between each transmitted pulse is known as the pulse repetition time ("PRT") that represents the time between the beginning of one pulse and the start of the next pulse.

Over time, individual transmit and receive cycles (having a period of operation equal to the PRT) of pulses are completed by the SAR with the data from each cycle being stored electronically by a processor within the SAR. The data includes all the radar returned signals, as amplitude and phase values, for a time period "T" from a first position to second position of the SAR along the flight path. At this point, it is possible to reconstruct a radar return signal that would have been obtained by an antenna of length v·T, where "v" is the platform speed along the flight path.

The SAR then preforms signal processing on the stored data. The signal processing utilizes the magnitudes and phases of the received radar return signals over successive pulses from elements of a synthetic aperture. After a given number of cycles, the stored data is recombined (taking into account the Doppler effects inherent in the different transmitter to target geometry in each succeeding cycle) to create a high resolution image of the terrain being over flown by the SAR.

It is noted that as the line of sight direction changes along the flight path of the platform of the SAR, a synthetic aperture is produced by signal processing, where the signal processing has the effect of artificially lengthening the antenna of the SAR. As such, making T large makes the "synthetic aperture" of the SAR antenna large and hence a higher resolution of the SAR may be achieved.

In general, the SAR images produced by a SAR are two-dimensional images that consist of range and cross-range (i.e., the azimuth) direction values. It is appreciated by those or ordinary skill in the art that the azimuth resolution is inversely proportional to the collection period T during which targets are illuminated by the antenna beam. Therefore, a fine resolution in azimuth may be achieved by increasing the array time for a spotlight mode or by reducing the antenna aperture size for stripmap mode. Additionally, the range resolution is inversely proportional to the bandwidth of the transmitted signal. As such, a fine resolution in range may be achieved by increasing the bandwidth of transmitted signal.

Unfortunately, although it is true that in theory the range resolution may be improved by utilizing a wideband signal, it is also true that, in practice, increasing the bandwidth of transmitted signal beyond certain point is costly and difficult to physically implement in reality. This is because typically front-end hardware components in a radar system includes filters, amplifiers, and an antenna—all of which generally have degraded performance as the signal bandwidth of operation increases.

One approach to avoid this problem has been to divide the full desired wideband signal into a sequence of multiple narrow sub-band signals and transmit the sub-band signals in consecutive sub-pulses with stepped center frequencies. Then, the received signals reflected from any backscatters, for each transmitted pulse, are combined to produce a composite received signal that is equivalent to a received signal from a wideband signal that had been transmitted.

In SAR systems the most commonly utilized waveform signals are linear frequency modulation ("LFM") signals. LFM signals are commonly referred to as "chirp modulation signals." They employ sinusoidal waveforms whose instantaneous frequency increases or decreases linearly over time. It is appreciated by those of ordinary skill in the art that these sinusoidal waveforms have advantages over other types of waveforms and are commonly referred to as "linear chirps" or simply "chirps."

Specifically, in a mode called "step chirp" or "stepped-chirp," a stepped-chirp waveform is utilized to improve the range resolution of an existing pulse compression radar such as a SAR. The pulse is frequency modulated so as to help resolve targets which may have overlapping returns and where a desired full wideband signal is divided into multiple narrow-band sub-bands with their center frequencies stepped between them. The sub-band signals are sequentially transmitted in sub-pulses. Then, the signals reflected from backscatters on ground, from each transmitted sub-pulse, are received and combined to synthesize a wideband composite received signal that is utilized to produce a high resolution SAR image. Generally, this technique is suitable for obtaining high range resolution in a radar system that has a limited instantaneous bandwidth, but a large tunable bandwidth.

Although SAR images of high range resolution may be obtained by utilizing a step chirp process, there is still a need to avoid degradation of the image quality due to amplitude and phase errors in the composite signal produced from all the sub-pulses. Both amplitude and phase errors in the composite signal may include periodic components which are common to all steps and non-periodic components which vary between steps. Additionally, amplitude and phase discontinuities may occur at the step boundaries of a stepped-chirp waveform.

These errors are a problem in step chirp that can degrade formed SAR image if not properly estimated and corrected. In particular, periodic errors may cause undesirable paired echoes in formed image. Additionally, the non-periodic errors and amplitude and phase discontinuities also may cause image degradation in sidelobe area of the impulse response. Therefore, there is a need to estimate and correct these amplitude and phase errors.

Attempts to solve this problem in the past include a method for estimating the amplitude and phase error in single-step signal as described in U.S. Pat. No. 7,999,724, titled "Estimation and Correction Of Error In Synthetic Aperture Radar," which issued Aug. 16, 2011 to inventor Kwang M. Cho and is herein incorporated by reference in its entirety. Unfortunately, this reference is limited in its disclosure to a single-step SAR and does not describe any way of correcting for errors in a step-chirp SAR.

As such, there continues to be a need in the art for a system and method to estimate and correct these amplitude and phase errors in a step chirp SAR system.

SUMMARY

Disclosed is a Radar Calibration Processor ("RCP") for calibrating the phase of a stepped-chirp signal utilized by a synthetic aperture radar ("SAR"). The RCP includes a periodic phase error ("PPE") calibrator, first non-periodic phase error ("NPPE") calibrator in signal communication with the PPE calibrator, and a second NPPE calibrator in signal communication with the first NPPE calibrator.

In an example of operation, the RCP preforms a method that calibrates the phase of the stepped-chirp signal by receiving SAR image data from an acquired radar target area that was scanned with a SAR utilizing a plurality of stepped-chirp signals and calibrating the phases of the stepped-chirp signals. The calibration of the phase is performed by estimating the phase errors in the stepped-chirp signals. The RCP performs this method by sequentially first calibrating the SAR image data with the PPE calibrator to remove periodic phase errors in the SAR image data. The RCP then calibrates the PPE calibrated SAR image data with the first NPPE calibrator to remove type-1 non-periodic phase errors from the PPE calibrated SAR image data to produce NPPE-1 calibrated SAR image data. The RCP then calibrates the NPPE-1 calibrated SAR image data with the second NPPE calibrator to remove type-2 non-periodic phase errors from the NPPE-1 calibrated SAR image data to produce NPPE-2 calibrated SAR image data. The RCP then passes the NPPE-2 calibrated SAR image data to other parts to the SAR for use in producing a SAR display image.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 17A is a plot of the initial input phase error as a function of phase (in degrees) versus range frequency samples.

FIG. 17B is a plot of the residual phase error after PPE calibration of orders 1 through 5 is shown.

FIG. 17C is a plot of the residual phase error after NPPE-1 calibration of orders 2 through 5 is shown.

FIG. 17D is a plot of the residual phase error after NPPE-2 calibration of order 0 and 1 is shown.

DETAILED DESCRIPTION

Disclosed is a Radar Calibration Processor ("RCP") for calibrating the phase of a stepped-chirp signal utilized by a synthetic aperture radar ("SAR"). The RCP includes a periodic phase error ("PPE") calibrator, first non-periodic phase error ("NPPE") calibrator in signal communication with the PPE calibrator, and a second NPPE calibrator in signal communication with the first NPPE calibrator.

In an example of operation, the RCP preforms a method that calibrates the phase of the stepped-chirp signal by receiving SAR image data from an acquired radar target area that was scanned with a SAR utilizing a plurality of stepped-chirp signals and calibrating the phases of the stepped-chirp signals. The calibration of the phase is performed by estimating the phase errors in the stepped-chirp signals. The RCP performs this method by sequentially first calibrating the SAR image data with the PPE calibrator to remove periodic phase errors in the SAR image data. The RCP then calibrates the PPE calibrated SAR image data with the first NPPE calibrator to remove type-1 non-periodic phase errors from the PPE calibrated SAR image data to produce NPPE-1 calibrated SAR image data. The RCP then calibrates the NPPE-1 calibrated SAR image data with the second NPPE calibrator to remove type-2 non-periodic phase errors from the NPPE-1 calibrated SAR image data to produce NPPE-2 calibrated SAR image data. The RCP then passes the NPPE-2 calibrated SAR image data to other parts to the SAR for use in producing a SAR display image.

Figure 1A:
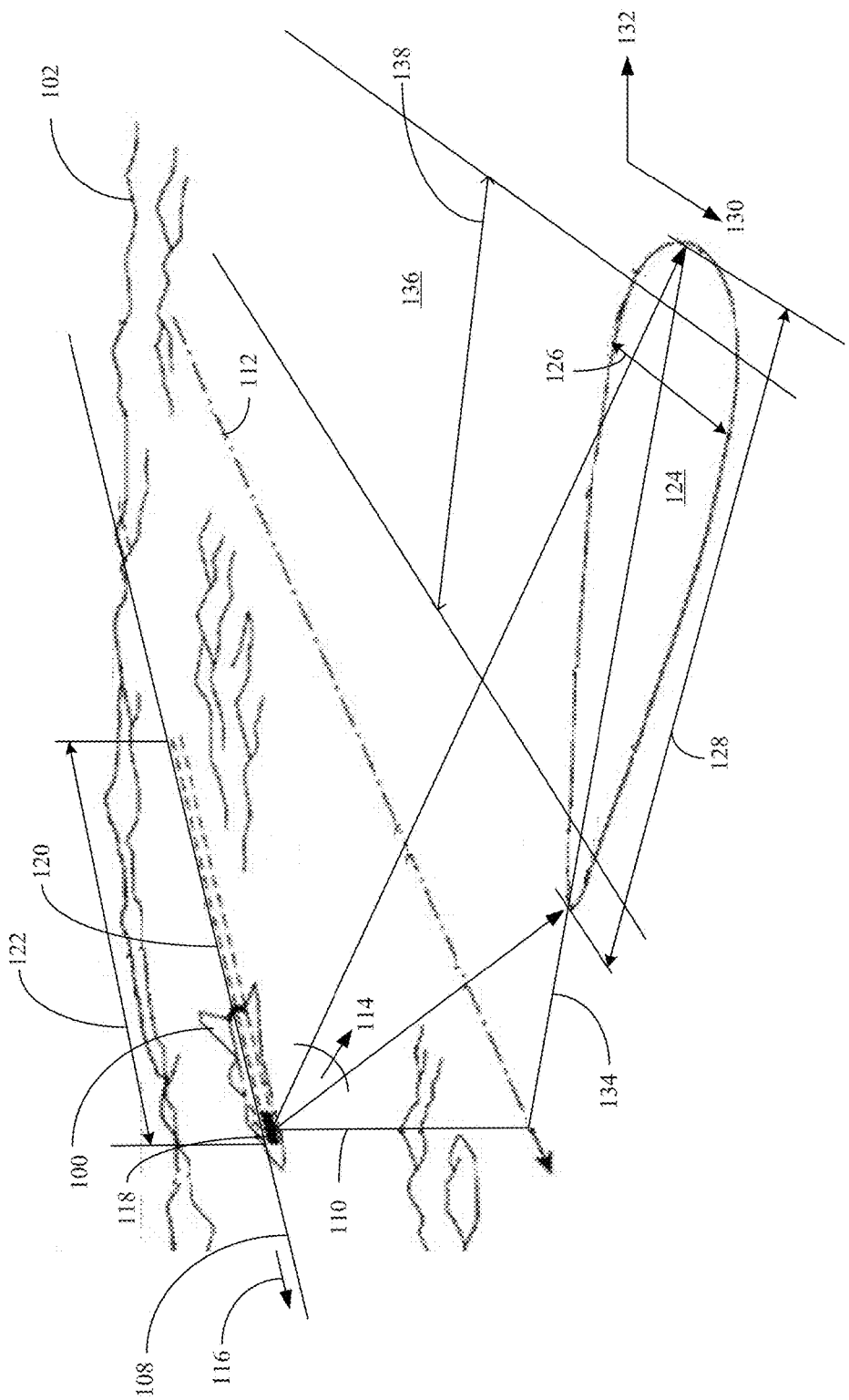
FIG. 1A is diagram of an example of a synthetic aperture radar ("SAR") imaging system on an aircraft flying a course along a flight path over a landmass in accordance with the present invention.
Figure 1B:
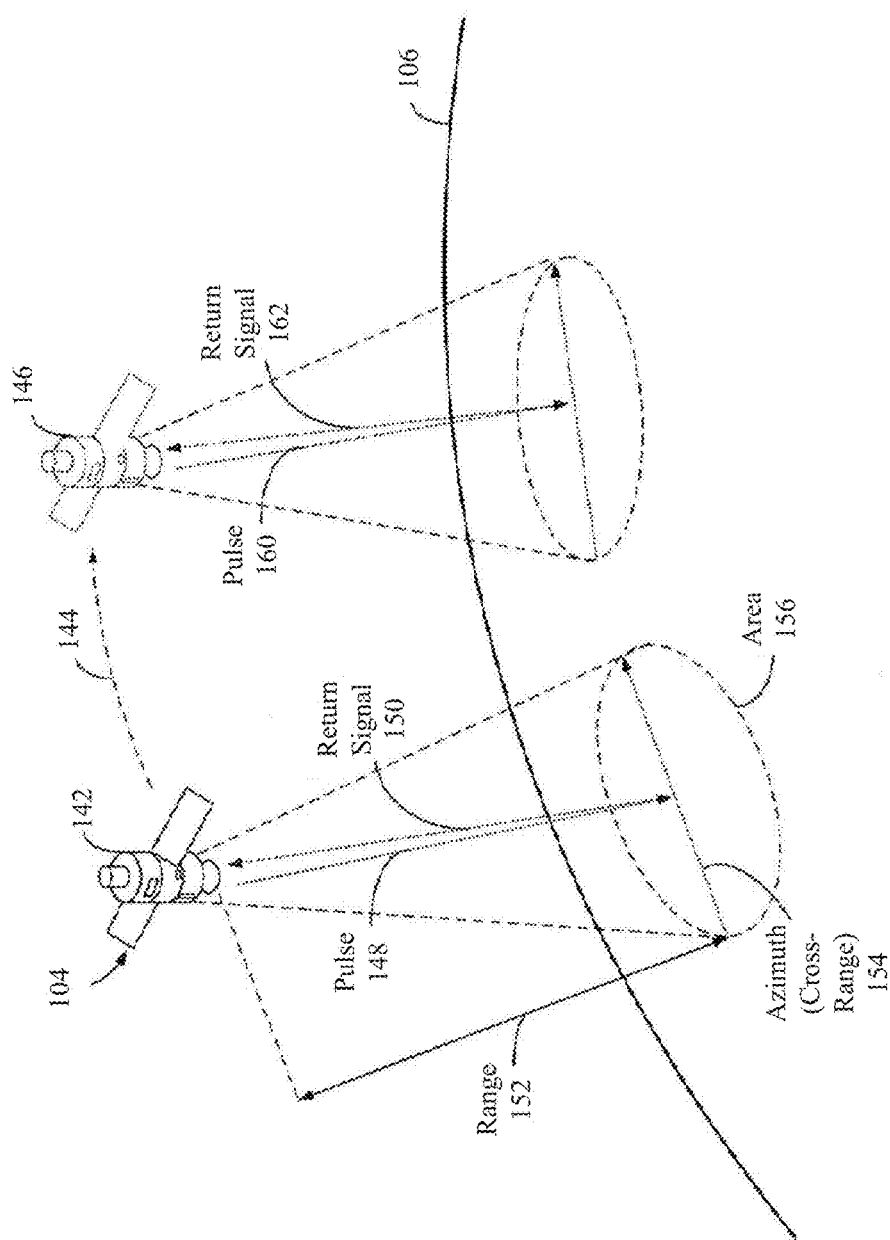
FIG. 1B is a diagram of an example of a SAR imaging system in an orbiting satellite in accordance with the present invention.

FIGS. 1A and 1B show typical examples of applications for a SAR system of two types of platforms that include aircrafts or satellites. In FIG. 1A, the platform is an aircraft 100 that is shown flying over a landmass 102. Similarly, in FIG. 1B, the platform is a satellite 104 that is shown flying over a planetary body 106.

In FIG. 1A, the aircraft 100 is shown flying a course along a flight path 108 at a constant altitude 110 with a nadir 112 directly beneath the aircraft 100. In an example of operation, a SAR system (not shown) located on the aircraft 100 radiates (i.e., transmits) SAR radar signal pulses 114 obliquely at right angles to the direction 116 of flight along the flight path 108. The SAR radar signal pulses 114 are transmitted from a SAR antenna 118 (i.e., the "real" antenna) located on the aircraft 100 that has a relatively small aperture size with a correspondingly small antenna length. As the aircraft 100 moves along the flight path 108, the SAR synthesizes a SAR synthetic antenna 120 that has a synthesized length 122 that is much longer than the length of the real antenna 118.

As the SAR radar signal pulses 114 hit the landmass 102 they illuminate an area 124 (i.e., a footprint) of the landmass 102. The illuminated area 124 corresponds to a width 126 and 128 of the main beam of the real antenna 118 in an along-track direction 130 and across-track direction 132 as it intercepts the landmass 102. In this example, the along-track direction 130 is parallel to the direction 116 of the flight path 108 of the aircraft 100 and it represents the azimuth 130 dimension for the SAR system. Similarly, the across-track direction 132 is perpendicular to the flight path 108 of the aircraft 100 and it represents the range 134 dimension of the SAR system. It is appreciated by those of ordinary skill in the art that in this example the width 128 of the main beam along the across-track direction 132 is longer than the width 126 along the azimuth 130 because the main beam of the SAR radar signal pulse 114 is being radiated at a look-down angle from the aircraft 100.

As the aircraft 100 travels along the flight path 108, the illuminated area 124 defines a swath 136, having a swath width 138, which is a strip along the surface of the landmass 102 that has been illuminated by the illuminated area 124 produced by the main beam of the real antenna 118. In this example, the length 122 of the synthetic antenna 120 is directly proportional to the range 134 in that as the range 134 increases, the length 122 of the synthetic antenna 120 increases.

Turning to FIG. 1B, an example of a SAR imaging system in an orbiting satellite 104 is shown. In this example, the satellite 104 is configured to capture SAR image data of a planetary body 106 to generate a "stripmap" SAR image of the planetary body 106. The orbiting satellite 104, as shown in FIG. 1, is orbiting from a first position 142 along a course 144 (i.e., a flight path) toward a second position 146.

In an example of operation, the orbiting satellite 104, at the first position 142, generates a pulse 148 through an antenna (not shown) and receives a returned signal 150 resulting from the pulse 148 using the same antenna. The pulse 148 is generated along a range 152 that represents a line of sight between the orbiting satellite 104 and the planetary body 106. The imaging data is collected for an azimuth (i.e., the cross-range dimension) 154 that is perpendicular to the range 152 and generally parallel with the course 144 of the orbiting satellite 104. In this example, the pulse 148 may be configured to image an area 156 surrounding the azimuth 154.

As the orbiting satellite 104 travels along the course 144, it will generate additional pulses and capture additional data. At the second position 146, for example, the orbiting satellite 104 may generate another pulse 160 that will result in an additional returned signal 162. In this manner, the orbiting satellite 104 may image a large area over which the course 144 of the orbiting satellite 104 extends over the planetary body 106. If the course 144 of the orbiting satellite 104 is not parallel with an equator of the planetary body 106, the course 144 of the orbiting satellite may eventually cause the orbiting satellite 104 to fly over an entire surface of the planetary body 106, enabling the orbiting satellite 104 to capture image data for the entire surface of the planetary body 106.

Figure 2:
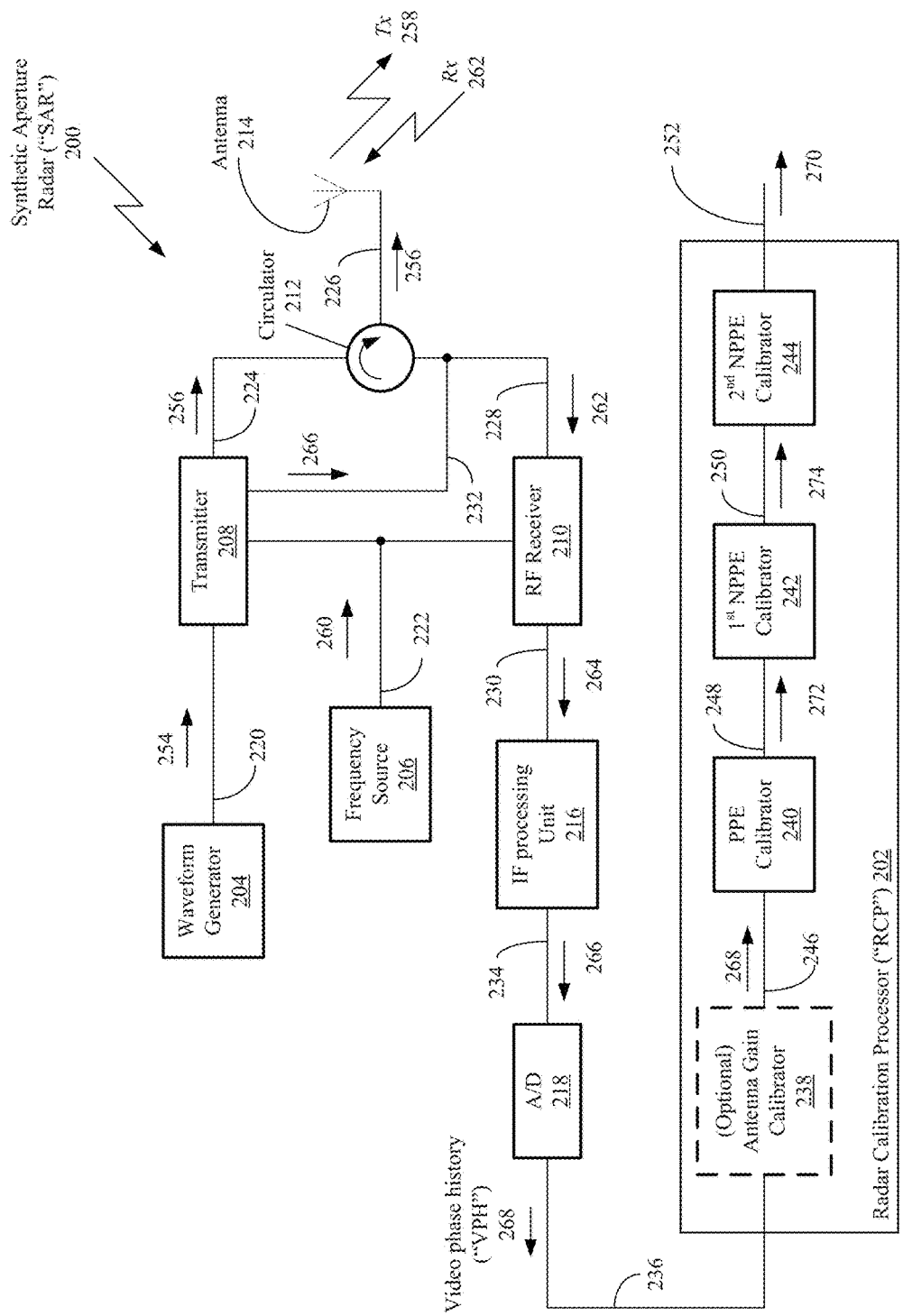
FIG. 2 is a block diagram of an example of an implementation of the SAR, of either FIG. 1A or 1B, having a radar calibration processor ("RCP") in accordance with the present invention.

In FIG. 2, a block diagram of an example of an implementation of a SAR 200 having a RCP 202 is shown in accordance with the present invention. The SAR 200 may include a waveform generator 204, frequency source 206, transmitter 208, radio frequency ("RF") receiver 210, circulator 212, antenna 214, intermediate frequency ("IF") processing unit 216, and analog-to-digital ("A/D") module 218. In this example, the waveform generator 204 is in signal communication with the transmitter 208 along signal path 220. The frequency source 206 is in signal communication with both the transmitter 208 and RF receiver 210 via signal path 222 and the circulator 212 is in signal communication with the transmitter 208, antenna 214, and RF receiver 210 via signal paths 224, 226, and 228, respectively. The RF receiver 210 is in signal communication with the IF processing unit 216 and optionally with transmitter 208 via signal paths 230 and 232, respectively. The A/D module 218 is in signal communication with the IF processing unit 216 and the RCP 202 via signal paths 234 and 236, respectively.

The RCP 202 may include an optional antenna gain calibrator 238, PPE calibrator 240, first NPPE calibrator 242, and second NPPE calibrator 244. In this example, the optional antenna gain calibrator is in signal communication with the A/D module 218 and the PPE calibrator 240 via signal paths 236 and 246, respectively. If optionally, there is no antenna gain calibrator 238, the PPE calibrator 240 would be in signal communication with the A/D module 218 via signal path 236. The first NPPE calibrator 242 is in signal communication with the PPE calibrator 240 and second NPPE calibrator 244 via signal paths 248 and 250, respectively. The second NPPE calibrator 244 may also be in signal communication with a SAR image processor (not shown) via signal path 252.

In an example, the waveform generator 204 is a device that is configured to produce pulsed waveforms that are passed to the transmitter 208 via signal path 220 for transmission. Typically, the waveform generator 204 utilizes pulse compression techniques to produce pulses for transmission that are encoded in linear frequency modulated ("FM") chirps. The FM chirped pulses are transmitted a pulse repetition frequency ("PRF"), which is the number of pulses transmitted per second. The FM chirped waveform pulses of extended duration reduce the peak transmitter power without a reduction in average power transmission. The chirp waveforms produced by the waveform generator 204 may still be too wide in bandwidth to provide sufficient range resolution for the SAR. As such, in order to further improve the range resolution of the SAR, the waveform generator 204 may produce a plurality of stepped-chirp waveform signals 254. In stepped-chirp operation, each wide bandwidth chirp waveform may be divided in to multiple sub-band chirp waveforms that have sub-bands that are steps of the wide bandwidth chirp waveform. These sub-band chirp waveforms (referred to as the stepped-chirp waveforms) may be transmitted by the transmitter 208. Once the reflected stepped-chirp signals are received by the RF receiver 210, they may be combined to synthesis a wide composite chirped signal that is similar to the original wide bandwidth chirp waveform. This wide composite chirped signal (herein also referred to as "composite chirped signal") may then be utilized to produce a high resolution SAR image.

Figure 3:
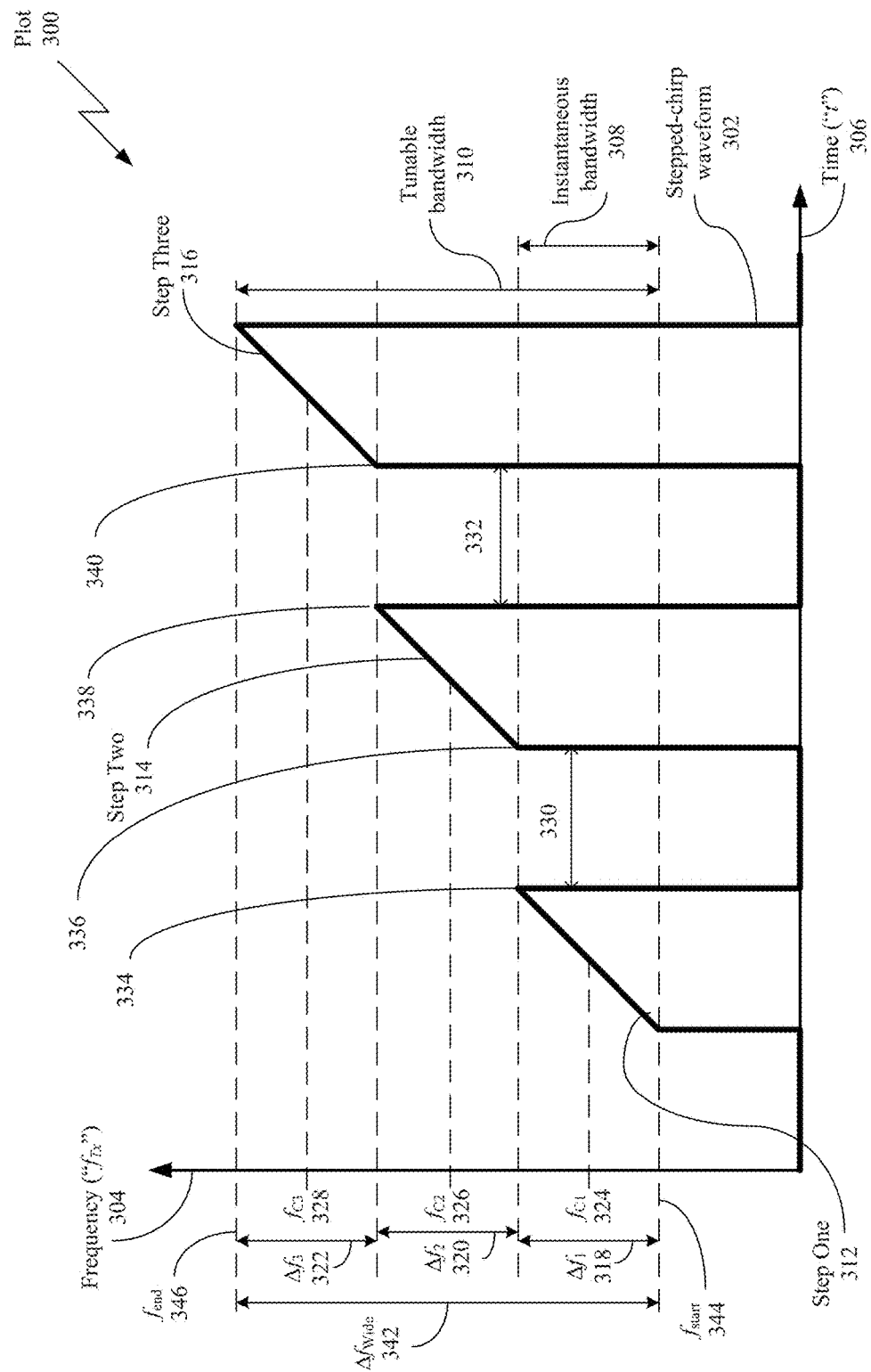
FIG. 3 is a plot of an example of an implementation of a stepped-chirp waveform in accordance with the present invention.

In FIG. 3, a plot 300 of a transmitted stepped-chirp waveform 302 is shown as a function of frequency ("$f_{Tx}$") 304 versus time ("t") 306. The transmitted stepped-chirp waveform 302 has an instantaneous bandwidth 308 and tunable bandwidth 310 as shown. Additionally, in this example the transmitted stepped-chirp waveform 302 is shown to have three steps 312, 314, and 316 having three corresponding frequency sub-bands $\Delta f_1$ 318, $\Delta f_2$ 320, and $\Delta f_3$ 322, centered around three center frequencies $f_{C_1}$ 324, $f_{C_2}$ 326, and $f_{C_3}$ 328, respectively. The three center frequencies $f_{C_1}$ 324, $f_{C_2}$ 326, and $f_{C_3}$ 328 are spaced (i.e., stepped) apart at a constant frequency spacing. The constant frequency spacing is not related to the pulse repetition time ("PRT") of the complete chirp waveform (i.e., the complete transmitted stepped-chirp waveform 302), which is the inverse of PRF. From FIG. 3, it is appreciated that the transmitted stepped-chirp waveform 302 has two discontinuities 330 and 332 between the step boundaries 334 and 336 of steps one 312 and two 314 and the step boundaries 338 and 340 of steps two 314 and three 316, respectively. In this example, the three steps 312, 314, and 316 are steps of the wider stepped-chirped waveform signal 302 that has a wide bandwidth $\Delta f_{Wide}$ 342 starting at a first frequency ("$f_{start}$") 344 and ending at a second frequency ("$f_{end}$") 346. The $f_{start}$ 344 also corresponds to the start frequency of step one 312 and $f_{end}$ 346 corresponds to the ending frequency of step three 316. It is appreciated by those of ordinary skill in the art that only three steps are shown in this example for the convenience of illustration and that the transmitted stepped-chirp waveform 302 may include a large number of steps well beyond just three.

Turning back to FIG. 2, the waveform generator 204 may produce the stepped-chirped signals 254 that are passed to the transmitter 208. The transmitter 208 may be a standard SAR type of transmitter that modulates and amplifies the stepped-chirp signal 254 to produce a modulated stepped-chirp signal 256 that is transmitted through the circulator 212 to the antenna 314 (via signal paths 224 and 226) and radiated 258 to the target area (i.e., 124 or 156) being scanned by the SAR 200. The transmitter uses a frequency reference signal 260 to modulate the stepped-chirped signal 254. The frequency reference signal 260 is produced by the frequency source 206 and passed to the transmitter 208 via signal path 222. The frequency source 206 may be a standard known SAR type of frequency source (such as, for example, a local oscillator or frequency synthesizer) capable of producing a high fidelity and stable frequency reference signal 260.

The RF receiver 210 may be a standard type of SAR front-end receiver capable of receiving a return modulated stepped-chirp signal 262 (via the antenna 214, signal path 226, the circulator 212, and signal path 228) and preforming coherent detection of the return modulated stepped-chirp signal 262. The RF receiver 210 may perform coherent detection of the return modulated stepped-chirp signal 262 by demodulating directly to a baseband signal (i.e., a return version of the stepped-chirped signal 254 in the case of the RF receiver 210 having a direct conversion demodulator (not shown)) or down-converting the return modulated stepped-chirp signal 262 from an RF signal to a lower IF frequency (i.e., in the case of the RF receiver 210 being a super heterodyne receiver) that is easier to process by the SAR. In the case of a super heterodyne type of RF receiver 210, the RF receiver may include a RF amplifier (not shown), a frequency mixer (not shown), and a frequency filter (not shown). The RF amplifier is configured to receive the return modulated stepped-chirp signal 262, amplify it with enough gain so that it may be properly heterodyned (i.e., mixed) by the mixer, and passing the amplified return modulated stepped-chirp signal to the mixer. The mixer would then mix the amplified return modulated stepped-chirp signal with the frequency reference signal 260 to produce a lower and higher frequency versions of the amplified return modulated stepped-chirp signal plus other harmonics. In this example, the frequency filter (such as, one or more band-pass filters) would block the higher frequency version and the harmonics to produce an IF return modulated stepped-chirp signal 264 which would be passed to the IF processing unit 216 via signal path 230.

The RF receiver 210 may also optionally receive a test signal 266 of the modulated stepped-chirp signal 256 via signal path 232, which bypasses both the circulator 212 and antenna 214. In this example, the transmitter 208 may include a loopback test switch (not shown) that allows a test signal 266 of the modulated stepped-chirp signal 256 to be passed via signal path 232 instead of signal path 224.

It is appreciated by those or ordinary skill in the art that the return modulated stepped-chirp signal 262 is only a portion of a reflected signal (not shown) produced by back scatter (i.e., an echo of a portion) of the transmitted 258 modulated stepped-chirp signal 256. As such, the return modulated stepped-chirp signal 262 is a typically a low power echo version of the modulated stepped-chirp signal 256 that includes (among others) Doppler, amplitude, and phase errors.

In this example, the IF processing unit 216 may be a component, module, or device capable of receiving the IF return modulated stepped-chirp signal 264, amplifying, and filtering the IF return modulated stepped-chirp signal 264 so that a detector may convert the IF pulses into image pulses that may be utilized to form the SAR image of the target area scanned by the SAR 200. Optionally, the IF processing unit 216 may be in signal communication with the frequency source 206 and/or the waveform generator 204 so as to receive the frequency reference signal 260 and/or the stepped-chirp signal 254. The IF processing unit 216 may be a hardware device, software module, or both, running on a processor (not shown), application specific integrated circuit ("ASIC"), field-programmable gate array ("FPGA"), or digital signal processor ("DSP"). The resulting processed IF signal data 266 is passed to the A/D module 218.

The A/D module 218 receives the IF signal data 266 and converts it to a digital data 268 that represents a video phase history ("VPH") of the IF signal data 266. The resulting VPH data 268 is then passed to the RCP 202 via signal path 236. The VPH data 268 may be the data of a composite signal of received stepped-chirp signals. It is appreciated that that the A/D module 218 and IF processing unit 216 may be combined into a single device, component, and/or module.

In this example, the frequency dependent antenna gain may need to be compensated because the antenna gain changes with frequency as well as location (i.e., the angle to the target area). It is appreciated that known techniques may be utilized in compensating for the frequency dependent antenna gain.

The RCP 202 receives the VPH data 268 and estimates the periodic and non-periodic phase errors and calibrates the VPH data 268 appropriately to produce phase corrected VPH data 270 that may be passed to other SAR imaging systems (not shown) via signal path 252. The RCP 202 may also optionally compensate the frequency dependent antenna gain with optional antenna gain calibrator 238.

The VPH data 268 includes time, frequency, and phase information that is indicative of range and azimuth (i.e., cross-range) information. Specifically, the SAR utilizes time and frequency information to determine the range values of the target area scanned by the SAR and utilizes the phase difference between successive samples to determine the azimuth values of the target area.

In determining the VPH data 268, the A/D module 218, IF processing unit 216, or both, may also include a hardware and/or software module that is capable of producing the VPH data 268. In general, the VPH data 268 is three dimensional raw SAR data for range, azimuth, and elevation of target data from the target area being scanned. Generally, this raw data is collected in a polar coordinate format that needs to be converted to rectangular coordinate format before image processing may be performed. If the raw data is thought of as described by as a range vector $k_R$ that has an elevation angle and azimuth angle, it may be converted to a rectangular format of $k_x$, $k_y$, and $k_z$ (utilizing a polar format algorithm ("PFA")) that represents the rectangular coordinate projections of the $k_R$ range vector. In this example, the $k_x$ represents the index number of the pulse of the return signal (i.e., the range) and $k_y$ represents the spatial frequency (i.e., range samples in each pulse return) of the return signal.

The RCP 202 receives the VPH data 268 and first preforms a PPE calibration with the PPE calibrator 240 to produce PPE calibrated data 272 that is passed to the first NPPE calibrator 242. The first NPPE calibrator 242 (also referred to herein as the NPPE-1 calibrator) performs an NPPE calibration for type-1 non-periodic phase errors ("NPPE-1") and produces NPPE-1 calibrated data 274 that is passed to the second NPPE calibrator 244. The second NPPE calibrator 244 (also referred to herein as the NPPE-1 calibrator) performs an NPPE calibration for type-2 non-periodic phase errors ("NPPE-2") and produces NPPE-2 calibrated data that corresponds to the phase corrected VPH data 270. The RCP 202 performs a combined method that first estimates the PPE that is common in all three types of phase errors (i.e., PPE, NPPE-1, and NPPE-2) and then estimates the NPPE-1 and NPPE-2 errors that vary between the steps of the chirp waveform contained in the VPH data 268. The methods performed by the RCP 202 are parametric approaches that set the error models utilizing Legendre polynomials and then determine the coefficients of the polynomial models that lead to best image quality. Generally, the approach is based on the fact that image quality is improved when phase error is reduced.

In an example of operation, the PPE calibration includes performing a search for the coefficients of an error model that is common to all the steps in the VPH data 268 (which is the data from the composite signal of all the steps of the stepped-chirp signals) by applying the same error correction to all the steps in the VPH data 268 to determine the best quality of the image formed from the VPH data 268.

The NPPE-1 calibration includes performing a search for the coefficients of another error model for all the steps in the PPE calibrated data 272 to determine the best quality image formed from the PPE calibrated data 272. The NPPE-1 calibration then produces the NPPE-1 calibrated data 274.

The NPPE-2 calibration takes the NPPE-1 calibrated data 274 and searches for the coefficients of a third error model for all the steps in the NPPE-1 calibrated data 274 to determine the best quality image formed from the NPPE-1 calibrated data 274. The NPPE-2 calibration performs a method that includes setting a phase error model of order one to apply to the data in the NPPE-1 calibration and search for the coefficients of the 0 order and first ("$0^{th}$ and $1^{st}$") order terms that lead to the best image quality from the concatenated data of two steps of the NPPE-1 calibrated data 274. When an image quality metric ("IQM") value is optimized, the composite signal of the two steps, of the NPPE-1 calibrated data 274, have the same phase error slope as the first step without a phase discontinuity at the step boundary between the two steps since it is the condition for the best image quality from the composite signal which includes concatenating the phase adjusted second step, of the NPPE-1 calibrated data 274, to the first step.

Next, the method takes the updated data of the second step (of the NPPE-1 calibrated data 274) with the phase adjustment and a new data value corresponding to the third step of the NPPE-1 calibrated data 274 and performs the same process of aligning the phase of the third step to that of the updated second step as was first done in updating the original second step to the first step. This process is then repeated up to the last step (of the NPPE-1 calibrated data 274) to produce an all continuous linear phase for all the steps. Once this process is complete, the phase slope of the composite signal after NPPE-2 calibration is that of the first step so the image from the composite signal after phase error correction may be shifted due to the slope of the phase error in the first step. As such, to avoid a potentially large image shift due to the steep linear phase of the first step, a global adjustment of the linear phase is performed using the phase adjustment terms of all the steps from the NPPE-2 calibration.

Phase Error Model and Image Quality Metrics

The Legendre polynomial is widely used to decompose a signal for its orthogonal property between different order terms on the interval $-1 \leq x \leq 1$. It can be generated recursively as the following.

$$P_0(x) = 1, P_1(x) = x$$

$$P_n(x) = \frac{(2n-1)xP_{n-1}(x) - (n-1)P_{n-2}(x)}{n} \text{ for } n \geq 2.$$

Using this approach, the phase error $\Delta\Phi(k)$ can be modeled using Legendre polynomials of order N as $$\Delta\Phi(x) = \sum_{n=0}^{N} a_n P_n(x) \text{ for } -1 \leq x \leq 1.$$

In general, the image quality is best when there is no phase error. As an example, low-order phase errors cause point target image degradations around the target image main-lobe and as the order of the phase errors increase the image degradation generally moves toward the farther side-lobe regions. Additionally, periodic phase errors create paired echoes in the image.

In general, the image quality is better when the image looks sharper and the image contrast is greater. Additionally, uncertainty in the image decreases when the image gets sharper and the image contrast increases.

Based on these properties, entropy may be utilized as an IQM in analyzing the VPH data 268 for phase errors. Entropy is a known metric for uncertainty measure that has been utilized in the area of communication theory. It is defined as follows $$M_E = -\sum_{i,j} Y(i,j) \log Y(i,j) \text{ where} \quad \text{(Equation \#1)}$$

$$Y(i,j) = \frac{|z(i,j)|^2}{\sum_{i,j} |z(i,j)|^2}$$

for an image pixel z(i,j) at position (i,j). It is an IQM that may be minimized. Another IQM that may be utilized is the negated 4-norm function defined as follows $$M_4 = \frac{-1}{I \cdot J} \sum_i \sum_j \left| \frac{z(i,j)}{\bar{z}(i)} \right|^4 \text{ where} \quad \text{(Equation \#2)}$$

$$\bar{z}(i) = \sqrt{\frac{1}{J} \sum_j |z(i,j)|^2}$$

for image pixel z(i,j) at position (i,j).

These two IQM functions may be utilized for searching for the coefficients of the phase error models described above in the PPE, NPPE-1, and NPPE-2 calibrations. The phase error models are modeled utilizing the Legendre polynomials and using an optimization function to minimize one of the two IQMs with the proper setting for the error application and image formation. The Broyden-Fletcher-Goldfarb-Shanno ("BFGS") algorithm may be utilized as an optimization function because it is a known iterative method for solving unconstrained nonlinear optimization problems. In general, the term optimization includes finding "best available" values of some objective function (i.e., in this case an IQM) given a defined domain (or a set of constraints) that may include a variety of different types of objective functions and different types of domains.

In this example, since the low-order phase error is generally dominant in each step, degradation due to phase errors occur near the main-lobe of the VPH data 268. As such, the 4-norm function IQM will perform better because it puts greater weights on the image pixels in the VPH data 268 that have higher intensities.

Input Data for the Calibration of Phase

There are two types of input data that can be considered for the estimation of the phase error in a stepped-chirp signal. The first one is the internally generated loopback signal (i.e., test signal 266) by bypassing antenna 214 and circulator 212. The internally generated loopback signal is a high fidelity signal with a very high signal-to-noise ratio ("SNR") that has not been radiated and received by antenna 214. However, since the antenna 214 has been bypassed, it does not include the phase error and/or amplitude error contributions from antenna 214. The RCP 202 may be configured to produce a separate estimation of periodic and non-periodic phase error components from the measured loopback signal 266.

The second type of input data is the return signal (i.e., the return modulated stepped-chirp signal 262) of the transmitted stepped-chirp pulses (i.e., the modulated stepped-chirp signal 256). As discussed earlier, since the amplitude and phase of the antenna gain changes with frequency as well as location (angle), proper compensation of antenna gain may be required. The compensation may be performed by the optional antenna gain calibrator 238. In this example, the phase calibration is performed on the data after compensating for the spatially and spectrally variant antenna gain.

As discussed earlier, since the collected chirp pulses are laid out in a radial direction in the spatial-frequency domain for polar format processing (i.e., a range vector $k_R$ that has an elevation angle and azimuth angle), the step boundaries are curved. Additionally, for image formation, the collected data needs to be interpolated as data samples on a rectangular grid (i.e., $k_x$, $k_y$ for a two-dimensional image). Unfortunately, this results in the step boundaries in the range frequency not being lined up when inverse processing is performed on the azimuth-compressed data from the gain-compensated image. However, since the crossing of the step boundaries is usually not that large, the step-to-step phase error and amplitude error may be estimated (approximately) from the gain-compensated data utilizing the present described calibration methods and this correction may be performed on the same data set.

If the curvature of the step boundary is not negligibly small (in the case of large SAR collection angle and bandwidth for ultra-high resolution), a limited portion of the collected pulses around the mid-array point may be utilized for the estimation of the phase error and amplitude error with accurate step boundaries.

Estimation of the Phase Error

As discussed earlier, the phase error of the stepped-chirp signal may be separated into periodic and non-periodic components, which have already been denoted as PPE and NPPE, respectively. The PPE is the repeatable phase error that is common to all steps due mainly to the hardware characteristics in the IF signal path. The IF signal path is the post mixing signal path, where the mixer (not shown) would be an RF mixer located in the RF receiver 210.

Figure 4:
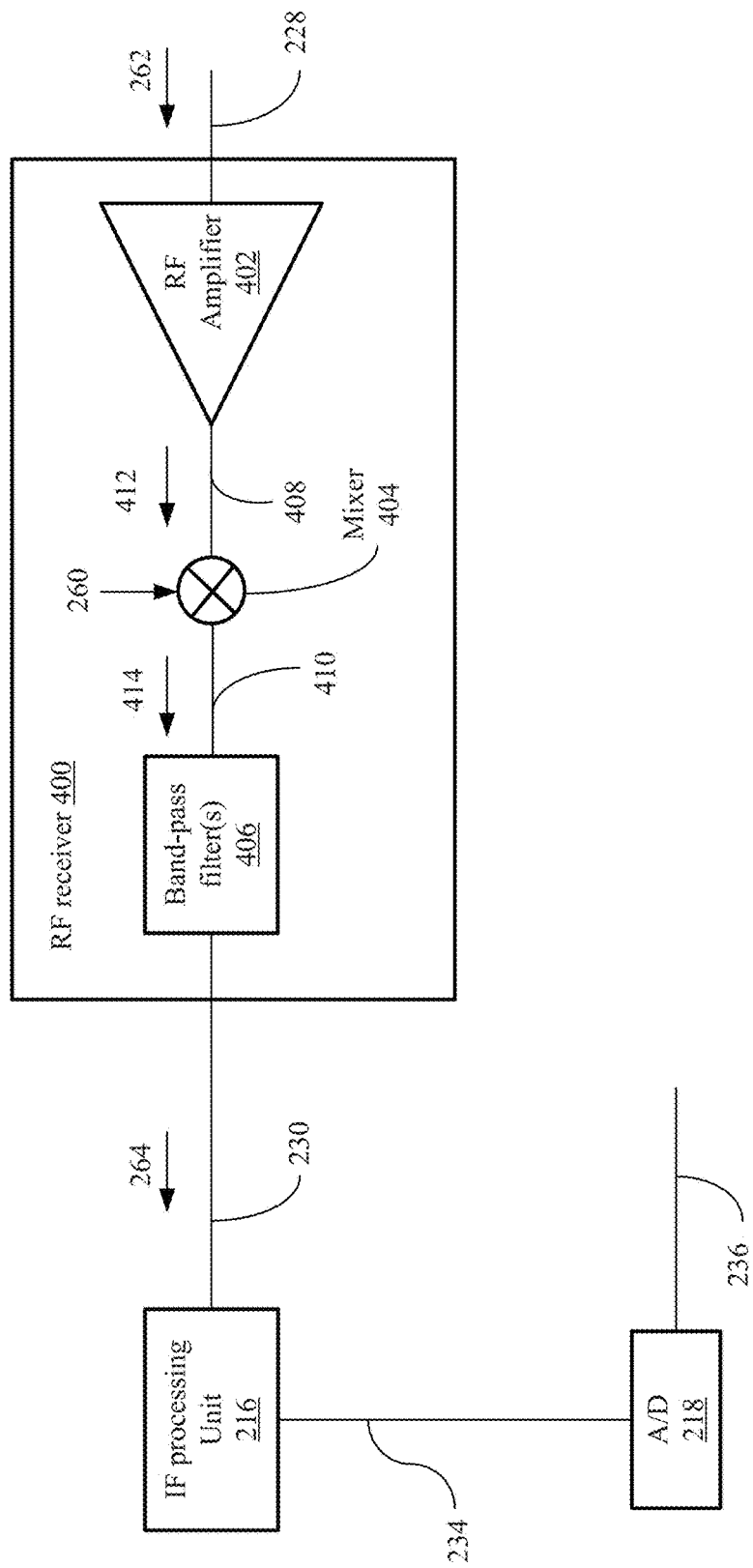
FIG. 4 is a block diagram of an example of an implementation of the radio frequency ("RF") receiver, of FIG. 2, in accordance with the present invention.

In FIG. 4, a block diagram of an example of an implementation of an RF receiver 400 is shown in accordance with the present invention. The RF receiver 400 is an example of an implementation of the RF receiver 210 shown in FIG. 2 and as such is in signal communication with the circulator 212 and IF processing unit 216 via signal paths 228 and 230, respectively. The RF receiver 400 may include an RF amplifier 402, RF mixer 404, and one or more band-pass filters 406. In this example, the RF mixer 404 is in signal communication with both the RF amplifier 402 and band-pass filter(s) via signal paths 408 and 410, respectively.

In an example of operation, as described earlier, the RF amplifier 402 receives the return modulated stepped-chirp signal 262 and amplifies it to produce an amplified return modulated stepped-chirp signal 412 that is passed to the RF mixer 404. The RF mixer 404 mixes the amplified return modulated stepped-chirp signal 412 with the frequency reference signal 260, from the frequency source 206, to produce the lower and higher frequency versions 414 of the amplified return modulated stepped-chirp signal 412 plus other harmonics. The band-pass filter(s) 406 then receive the mixed signal 414 and block the higher frequency version and the harmonics to produce the IF return modulated stepped-chirp signal 264 which is passed to the IF processing unit 216 via signal path 230.

In this example, the IF signal path would start at signal path 414 (i.e., post the RF mixer 404) and would continue until signal path 236 into the RCP 202. In addition to phase error caused by the common hardware in the IF signal path, there may also be a common phase error that contributes to the PPE that occurs in the RF signal path (i.e., before the RF mixer 404 that includes the signal path from the antenna 214 to signal path 408 after the RF amplifier 402) but is independent from the RF bandwidth.

At this point it is noted that the estimation and correction of PPE calibration may be optionally bypassed to go directly to the NPPE calibration in both NPPE-1 and NPPE-2. However, this approach, while providing generally acceptable results, is not a good as the approach that includes a full method of all three stages of calibration (i.e., PPE calibration, NPPE-1 calibration, and NPPE-2 calibration) because calibrating only for non-periodic phase error generally tends to show slightly larger inaccuracies compared with that of separated processing of periodic phase errors (i.e., PPE) and non-periodic phase error (i.e., NPPE-1 and NPPE-2). Furthermore, without eliminating the linear phase error through the PPE correction, the resulting residual global linear phase after the NPPE-2 processing tends to be greater and this leads to increased image shift. Additionally, performing separate estimates of the PPE and NPPE can be useful to understanding and diagnosing error contributions through the RF and IF signal paths. This process is described in FIG. 5.

Figure 5:
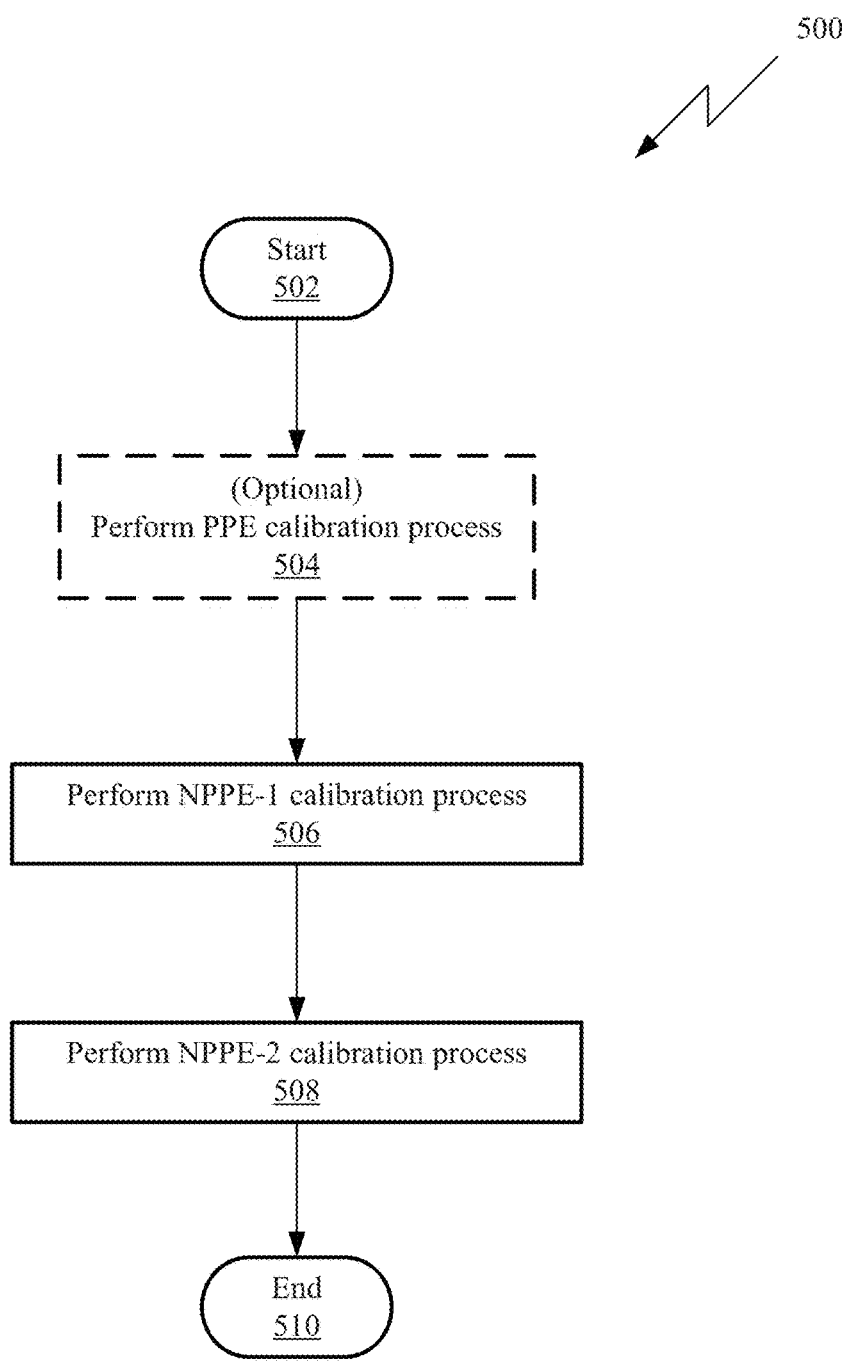
FIG. 5 is a flowchart of an example of an implementation of the method performed by the RCP in determining the phase error in accordance with the present invention.

In FIG. 5, a flowchart 500 is shown of an example of an implementation of the method performed by the RCP 202 in determining the phase error. The flowchart 500 shows that the method has three sub-methods that are performed sequentially. Specifically, the process starts 502 and the first sub-method 504 performed is the optional PPE calibration process 504. The process then continues to the second sub-method 506 and performs the NPPE-1 calibration process 506. The process then proceeds to the third sub-method 508 and performs the NPPE-2 calibration process 508. The process then ends 510. As discussed earlier, the optional PPE calibration 504 need not be performed and the method may only include sub-methods 506 and 508, however, it is preferable to perform all three sub-steps 504, 506, and 508.

Turning to the NPPE, the NPPE is the phase error that is unique in each step. It is mainly caused by the hardware in the RF signal path. Since the PPE and NPPE are mixed in range-frequency data, the phase error may be estimated and compensated in a selected central data block of the VPH data 268 in a sequential manner for VPH data 268 of real collection data from the return modulated stepped-chirp signal 262. In this example, the range frequency is the dimension converted from the range in the spatial domain, which is done by taking an inverse Fourier transform of the VPH data 268 in a matched filter approach. The azimuth compressed data may be expressed with two phase components for the range frequency index ("k") in step "m" and the backscatter coefficients $\sigma_i$ by omitting the azimuth index for simplicity. In this example, m represents the index of the total number of steps "M" in the chirped signal.

In this method, the first phase term $\Phi_{i,m}^{BS}$ for the backscatter with index "i" is linear in k with a slope "$u_i$" that is directly related to the target location and the second phase term $\Phi_m^{PE}$ is the total phase error comprised of the PPE and NPPE. As such, utilizing these definitions, the azimuth compressed data with phase noise $\eta$ may be expressed as $$s_{k,m} = \sum_i \sigma_i \exp[j(\Phi_{i,m}^{BS} + \Phi_m^{PE} + \eta)]$$

where $$\Phi_{i,m}^{BS} = 2\pi \frac{u_i \cdot k}{K} \text{ and}$$
$$\Phi_m^{PE} = \Phi_m^{PPE} + \Phi_m^{NPPE}.$$

PPE Calibration

The PPE calibration is the first stage of calibration. In the PPE calibration process, the PPE is estimated by searching for the coefficients of the common phase error model that leads to a minimum IQM of the formed image from the composite signal when the calculated common phase error from the error model is compensated in the range-frequency domain for each step. The search for the optimum coefficients of the phase error model may be accomplished utilizing, for example, the efficient multidimensional optimization method of the BFGS.

The PPE, which is common for all of the steps, is expressed using the Legendre polynomials starting from order one to order $O_{ppe}$ as follows $$\Phi_m^{PPE} = \Phi^{PPE} = \sum_{i=1}^{O_{ppe}} a_i P_i(\hat{k}).$$

All the polynomial terms that affect the quality of the image formed from the composite signal may be included as shown in this expression starting from order one. In this expression, the "$O_{ppe}$" term is the maximum order of the polynomials that can be set to a reasonable number based on an anticipated phase error profile—for example, the $O_{ppe}$ may have a value equal to 5. In this analysis it is noted that the maximum order of the phase error than may be estimated in a composite signal is approximately M times $O_{ppe}$ since the estimated periodic phase error is repeated through all steps.

For the orthogonality of the Legendre polynomial, the range of the index k value is limited to $-1 \leq \hat{k} \leq 1$. To align the collected data to the phase value to be applied using Legendre polynomial, the conventional indices of range frequency samples denoted by "k" are mapped to $\hat{k}$ by the expression $$\hat{k} = \frac{2}{K-1} \cdot \left(k - \frac{K-1}{2}\right) \text{ for } k = 0, 1, \ldots, K-1.$$

In this expression, K represents the total number of range frequency samples that is mapped to $\hat{k}$ such that k is equal to 0 and K−1 maps to $\hat{k}=-1$ and 1, respectively, because the Legendre polynomials are orthogonal in this range. From these expressions, it is noted that paired echoes appear when the PPE is not fully compensated since it is periodic. Therefore, it is necessary to use an IQM that is sensitive to the intensity changes of the paired echoes. For this example method, both $M_E$ (described by equation #1) and $M_4$ (described by equation #2) are acceptable with comparable performances. Using typical weights such as Han (also known as Hanning) or Taylor windowing (i.e., using a window function) prior to a fast Fourier transform ("FFT") produces good results.

Figure 6:
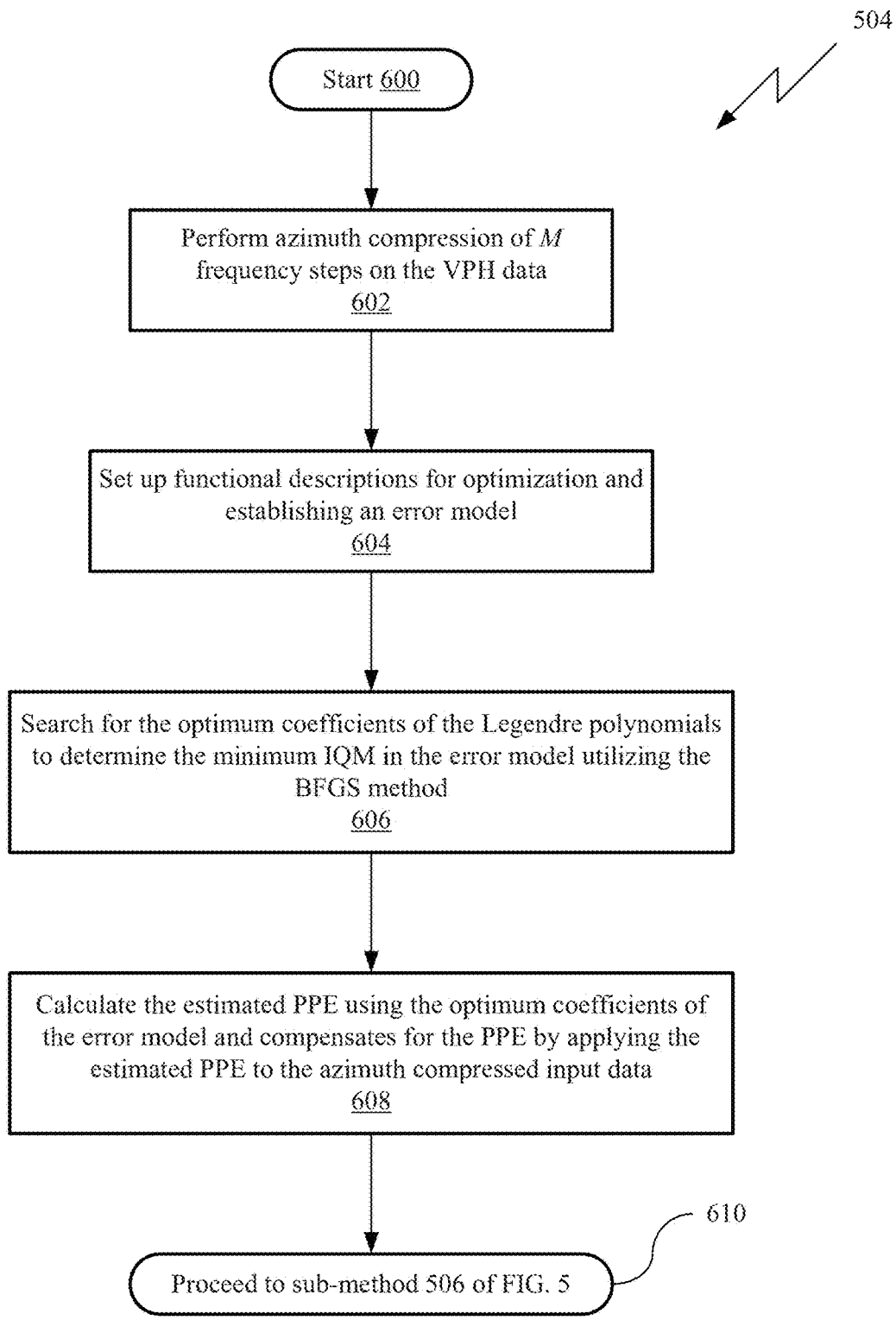
FIG. 6 is a flowchart of an example of implementation of the sub-method for preforming the PPE calibration shown in FIG. 5 in accordance with the present invention.

As discussed earlier, the first sub-method (the PPE calibration 504 in FIG. 5) of the method performed by the RCP in determining the phase error is described in FIG. 6. In FIG. 6, a flowchart of an example of implementation of the sub-method for preforming the PPE calibration 504 is shown in accordance with the present invention. The process starts 600 by performing an azimuth compression of M frequency steps on the VPH data in step 602. Then functional descriptions are set up (i.e., defined) for optimization and an error model is established in step 604. This step may include multiple sub-steps that will be described in FIG. 7. The process, in step 606, then searches for the optimum coefficients of the Legendre polynomials to determine the minimum IQM in the error model utilizing the BFGS method. Then, in step 608, the process calculates the estimated PPE using the optimum coefficients of the error model and compensates for the PPE by applying the estimated PPE to the azimuth compressed input data. The process then proceeds to the second sub-method of NPPE-1 calibration in step 610. The phase-compensated data after the PPE processing in sub-method 504 is used as the input for NPPE-1 processing in NPPE-1 calibration of step 610.

Figure 7:
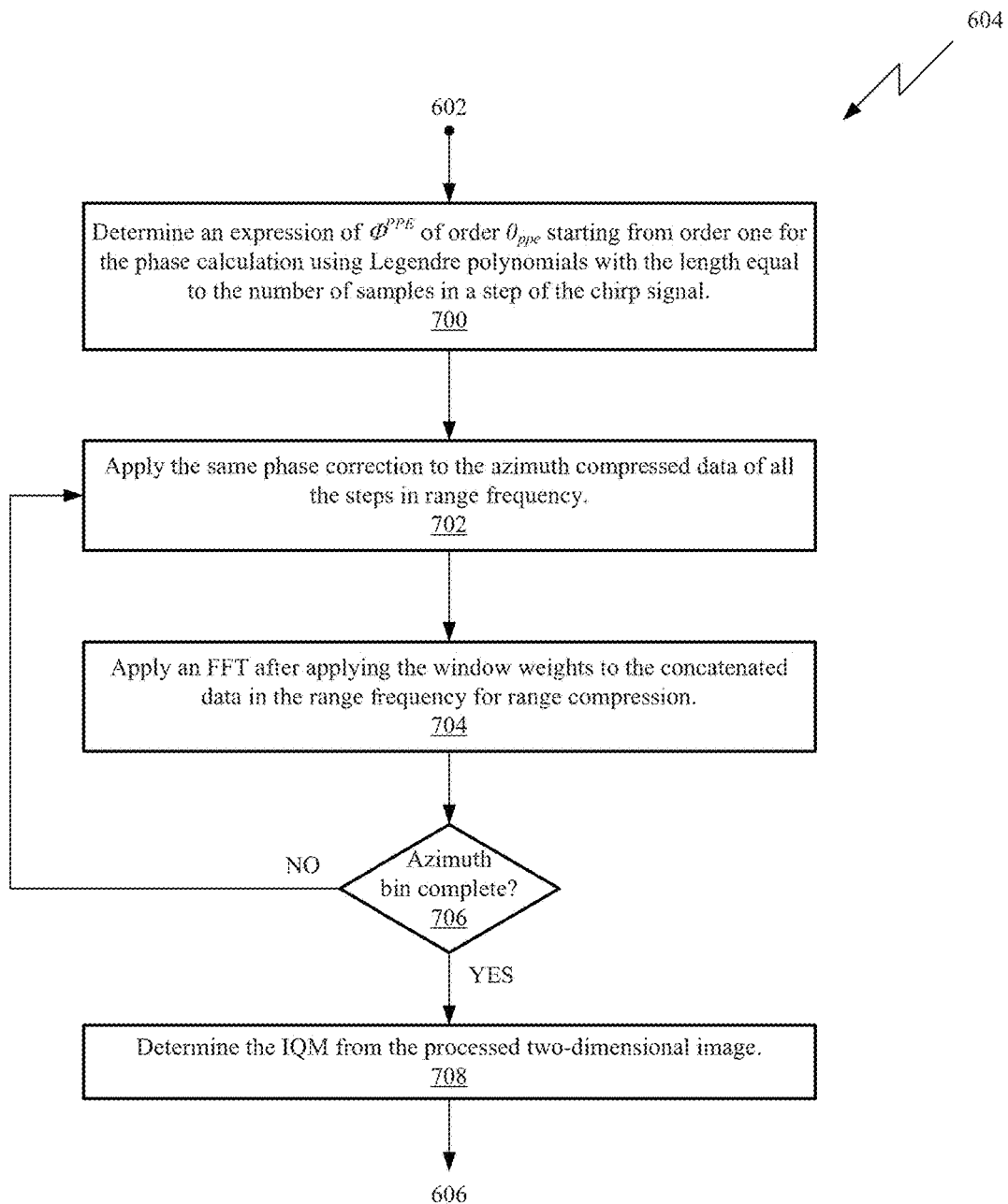
FIG. 7 is a flowchart of an example of an implementation of the sub-process for setting up the functional descriptions shown in FIG. 6 in accordance with the present invention.

In FIG. 7, a flowchart of an example of an implementation of the sub-process for setting up the functional descriptions of step 604 is shown in accordance with the present invention. The process receives the azimuth compressed data from step 602 and, in step 700, determines an expression of $\Phi^{PPE}$ of order $O_{ppe}$ starting from order one for the phase calculation using Legendre polynomials with the length equal to the number of samples in a step of the chirp signal. The process, in step 702, then applies the same correction phase to the azimuth compressed data of all the steps in the range frequency. The process, in step 704, then applies an FFT after applying the window weights to the concatenated data in the range frequency for range compression. The process then determines (in decision step 706) if all the image azimuth pixels (generally known as "azimuth bins") have been processed, if not the process repeats steps 702 and 704 until all the azimuth bins have been processed. If all the image azimuth pixels have been processed, the process, in step 708, then determines the IQM from the processed two-dimensional image, where the IQM may be $M_E$ (described by equation #1) or $M_4$ (described by equation #2). The information is then passed to step 606 which searches for the optimum coefficients of the Legendre polynomials to determine the minimum IQM in the error model utilizing the BFGS method.

Figure 8:
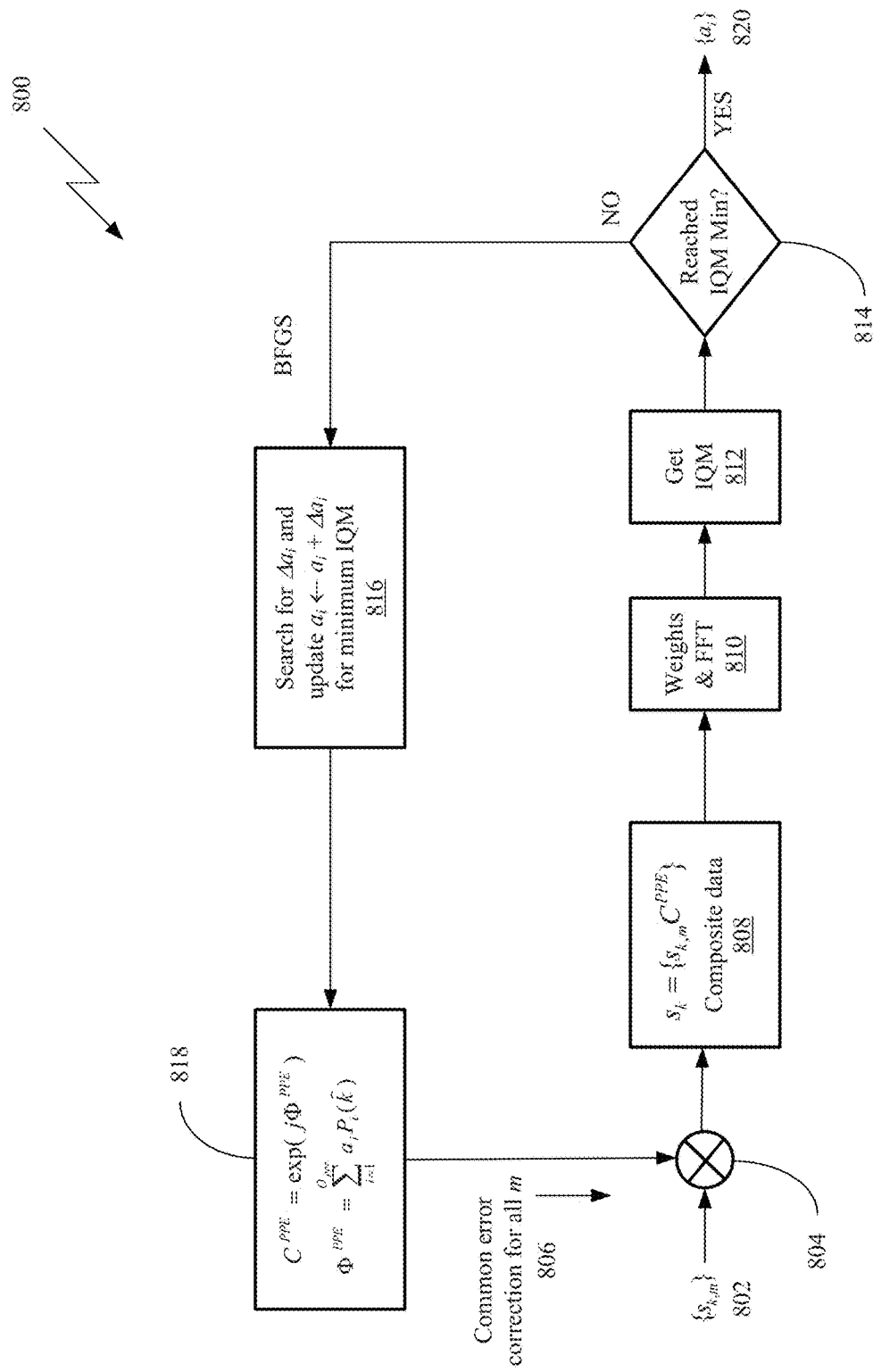
FIG. 8 is a functional flow diagram describing the process described in FIGS. 6 and 7 for the estimation of the PPE in accordance with the present invention.

Turning to FIG. 8, a functional flow diagram 800 is shown further describing the process described earlier by the flowcharts shown in FIGS. 6 and 7 for the estimation of the PPE in accordance with the present invention. In this example, the azimuth compressed data {$s_{k,m}$} 802 is multiplied 804 by a PPE common error correction value ("$C^{PPE}$") 806 for all m and concatenated into the composite data $s_k=\{s_{k,m}C^{PPE}\}$ 808. Initially, the value of $C^{PPE}$ 806 is equal to 1. Window weights are applied to the concatenated data of the composite signal in the frequency range and an FFT is applied (in functional block 810). The process then determines the IQM from the processed two-dimensional image, where the IQM may be $M_E$ (described by equation #1) or $M_4$ (described by equation #2) in functional block 812. If the minimum IQM is not reached (in decision block 814), the process searches (in function block 816) for the optimum coefficients of the Legendre polynomials to determine the minimum IQM in the error model utilizing the BFGS method. Specifically, the process searches for difference values of the coefficients ("$\Delta a_i$") and updates the coefficients ("$a_i$") by applying the difference values to the earlier coefficient, i.e., $a_i=a_i+\Delta a_i$. The updated coefficients are utilized, in functional block 818, to determine the PPE phase error per the earlier described expression $$\Phi^{PPE} = \sum_{i=1}^{O_{ppe}} a_i P_i(\hat{k}).$$

The $C^{PPE}$ is then updated by the relationship $C^{PPE}=\exp(j\Phi^{PPE})$ and the new $C^{PPE}$ 806 is multiplied 804 against the azimuth compressed data {$s_{k,m}$} 802 and functional flow process repeats until the minimum IQM is reached (in decision block 814), the process then produces the optimized coefficient values {$a_i$} 820.

NPPE Calibration

The NPPE calibration is the second and third stage of calibration. The estimation of NPPE is divided into two stages because the way they affect the image is different and hence needs to be estimated in two separate stages.

1. NPPE-1 Calibration

The NPPE-1 calibration is the first part of NPPE processing for the error orders two and higher that affect the IQM of the image in each step. Since the phase errors of $0^{th}$ and $1^{st}$ order do not degrade the image quality in each step within the chirp signal, they cannot be estimated by optimizing the IQM of the image in each step. As such, they will be handled in the next stage, i.e., the NPPE-2 processing stage.

Similar to the model for PPE, the phase error model utilized for NPPE-1 is expressed by $$\Phi_m^{NPPE-1} = \sum_{i=2}^{O_{nppe}} a_i P_i(\hat{k}).$$

The phase errors vary between steps in the chirp signal as indicated by the subscript m in above expression and the lowest order of the Legendre polynomial that is equal to 2. Additionally, $O_{nppe}$ is the maximum order of the polynomials that may be set to a reasonable number based on the anticipated phase error profile. In this example $O_{nppe}$ may be set to a value equal to 5. If the order of the phase error in each step of the chirp signal is generally not that high, the $M_4$ IQM shows slightly better results over $M_E$ IQM.

Figure 9:
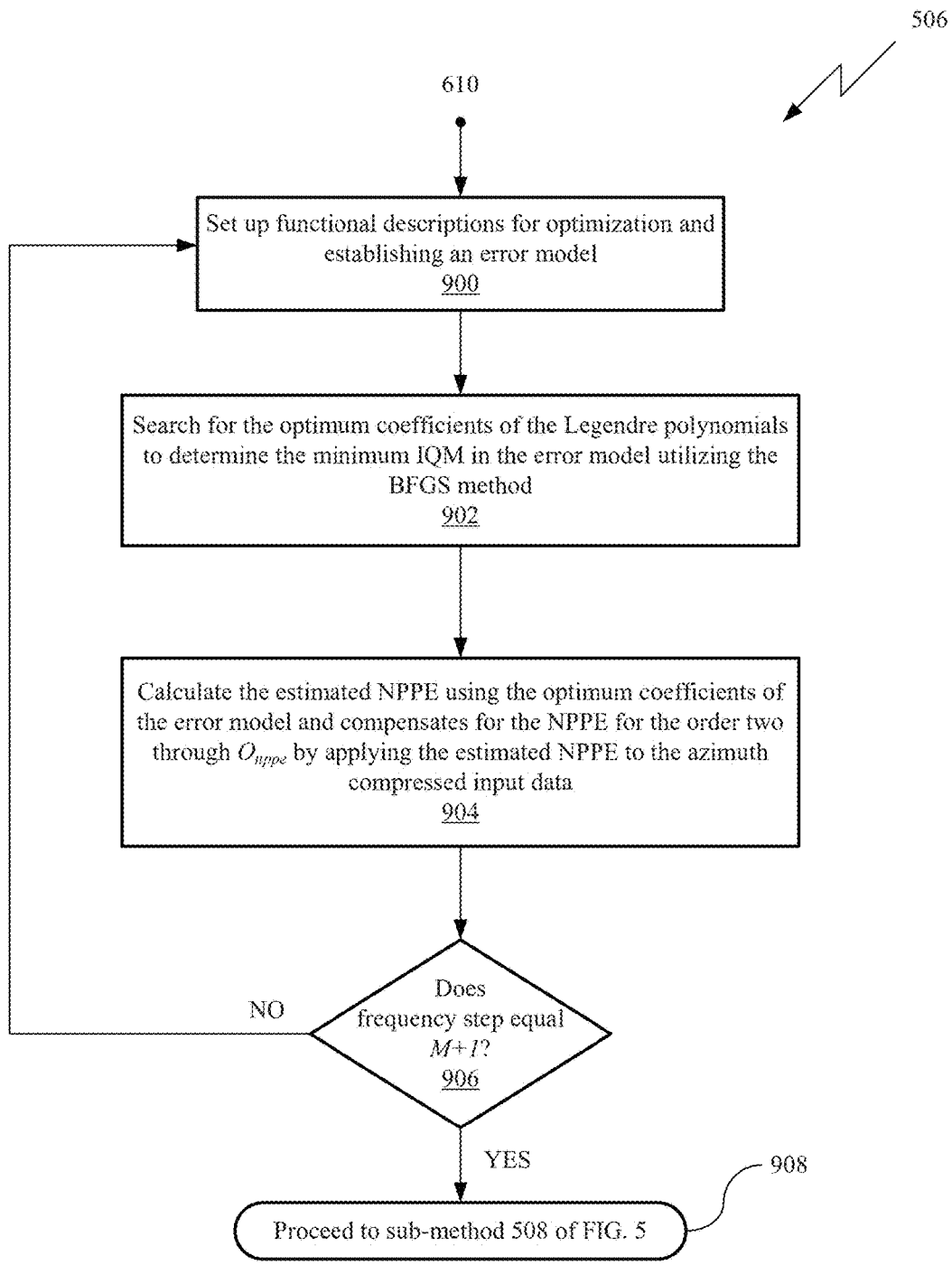
FIG. 9 is a flowchart of an example of implementation of the sub-method for preforming the NPPE-1 calibration shown in FIG. 5 in accordance with the present invention.

As discussed earlier, the second sub-method (the NPPE-1 calibration 506 in FIG. 5) of the method performed by the RCP in determining the phase error is described in FIG. 9. In FIG. 9, a flowchart of an example of implementation of the sub-method for preforming the NPPE-1 calibration 506 is shown in accordance with the present invention. The process starts 610 by receiving the PPE corrected data for M frequency steps after PPE processing (as was described in FIG. 6). In this example, the dimensions of the PPE corrected data are azimuth bins and range frequency. Then functional descriptions are set up for optimization and an error model is established in step 900. This step 900 may include multiple sub-steps that will be described in FIG. 10. The process, in step 902, then searches for the optimum coefficients of the Legendre polynomials to determine the minimum IQM in the error model utilizing the BFGS method. Then, in step 904, the process calculates the estimated NPPE using the optimum coefficients of the error model and compensates for the NPPE for the order two through $O_{nppe}$ by applying the estimated NPPE to the azimuth compressed input data that has been PPE corrected (i.e., the PPE corrected data). The process between steps 900 and 904 is repeated for all the frequency steps in the chirp signal, which include step 1 through step M. Once all M steps have been processed, the decision step 906 (determines that the loop value is equal to M+1) passes the NPPE-1 corrected data to next sub-method 508 for calibration of the NPPE-2 phase errors.

Figure 10:
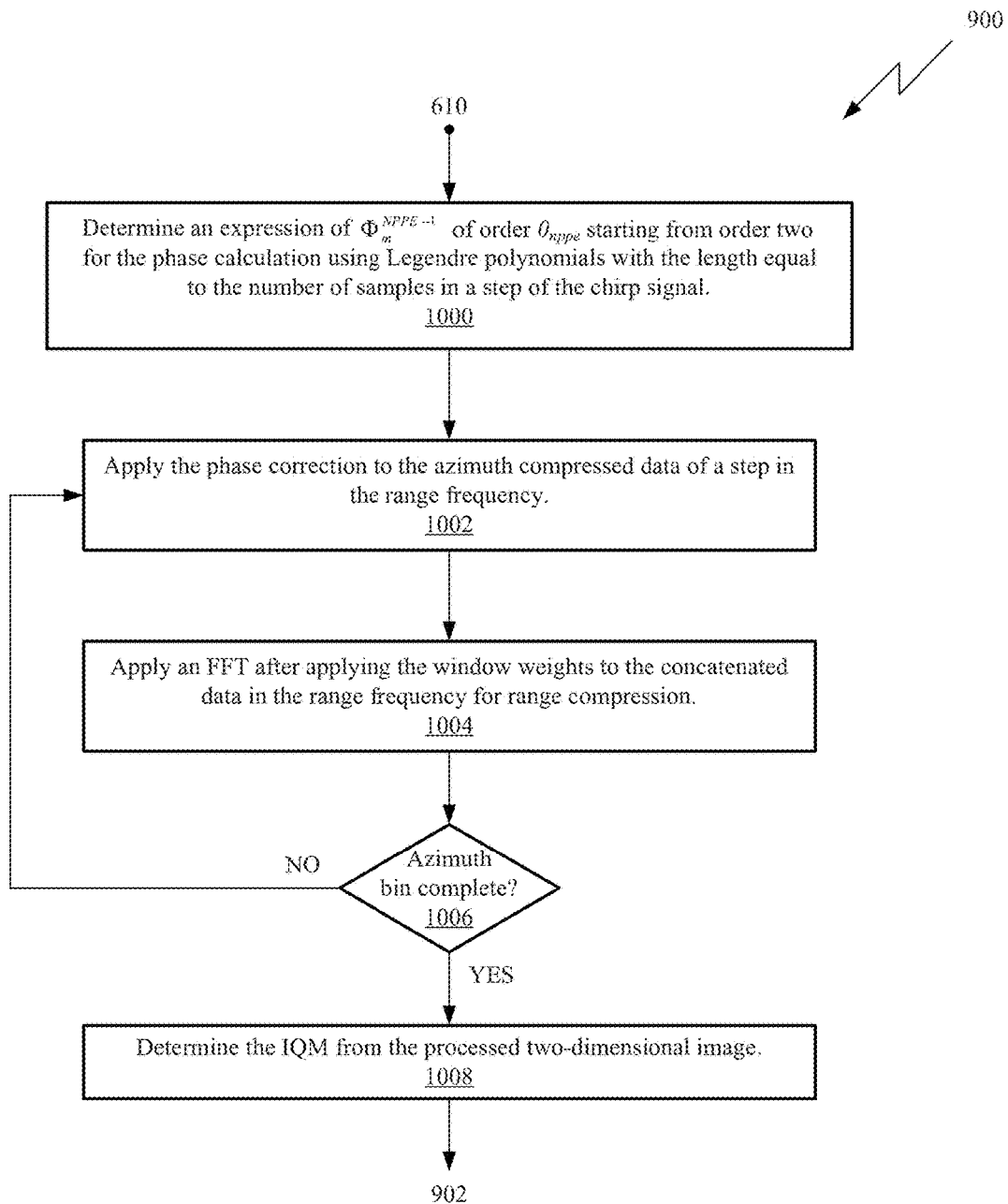
FIG. 10 is a flowchart of an example of an implementation of the sub-process for setting up the functional descriptions shown in FIG. 9 in accordance with the present invention.

In FIG. 10, a flowchart of an example of an implementation of the sub-process for setting up the functional descriptions of step 900 is shown in accordance with the present invention. The process receives the PPE corrected data for M frequency steps after PPE processing from step 610 and, in step 1000, determines an expression of $\Phi_m^{NPPE-1}$ of order $O_{nppe}$ starting from order two for the phase calculation using Legendre polynomials with the length equal to the number of samples in a step of the chirp signal. The process, in step 1002, then applies the correction phase to the azimuth compressed data of a step in the range frequency. The process, in step 1004, then applies an FFT after applying the window weights to the concatenated data in the frequency range for range compression. The process then determines (in decision step 1006) if all the azimuth bins have been processed, if not the process repeats steps 1002 and 1004 until all the azimuth bins have been processed. Once all the azimuth bins have been processed, the process, in step 1008, then determines the IQM from the processed two-dimensional image, where the IQM may be $M_4$ (described by equation #2). The information is then passed to step 902 which searches for the optimum coefficients of the Legendre polynomials to determine the minimum IQM in the error model utilizing the BFGS method.

Figure 11:
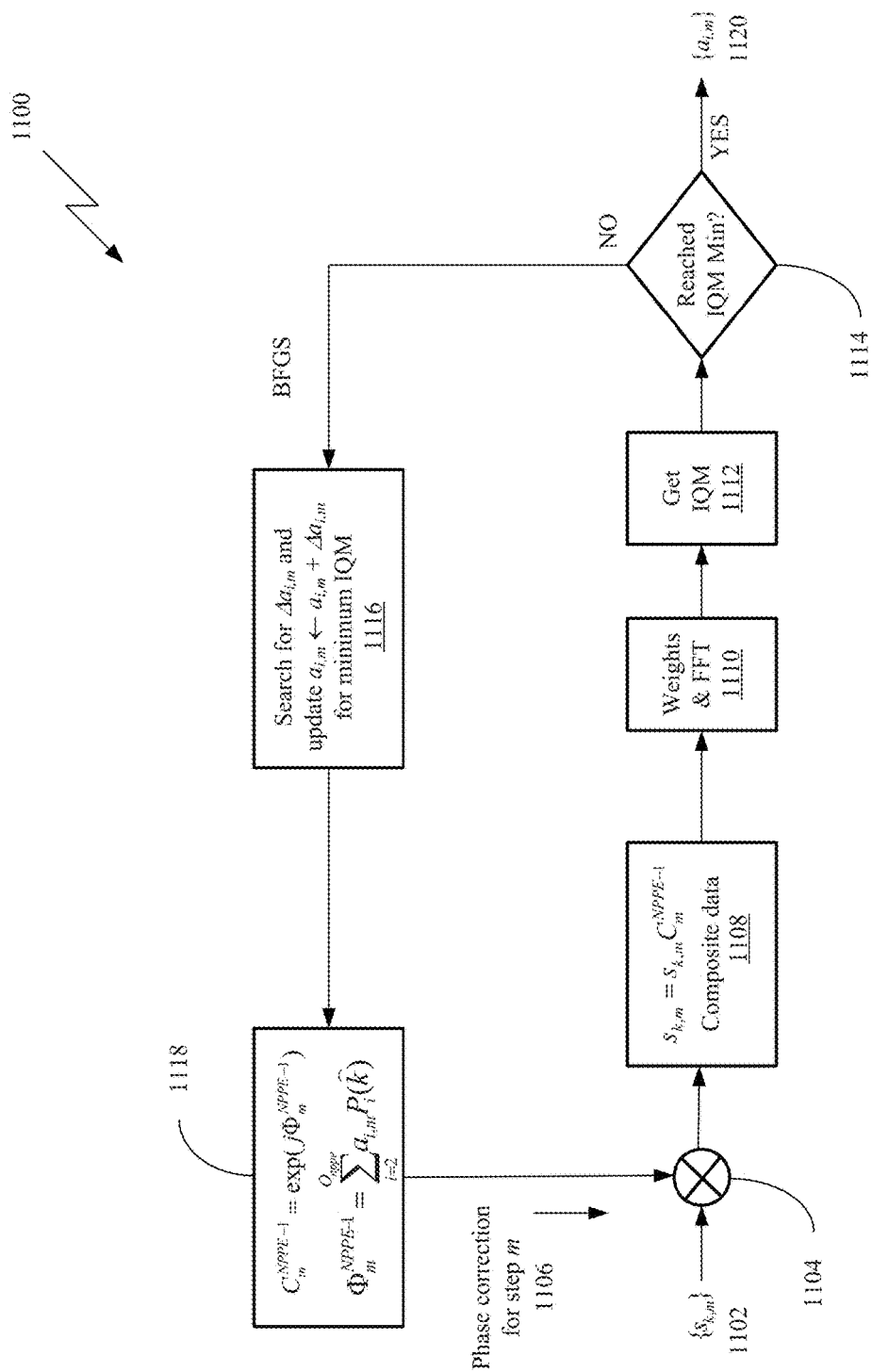
FIG. 11 is a functional flow diagram describing the process described in FIGS. 9 and 10 for the estimation of the NPPE-1 in accordance with the present invention.

Turning to FIG. 11, a functional flow diagram 1100 is shown further describing the process described earlier by the flowcharts shown in FIGS. 9 and 10 for the estimation of the NPPE-1 is shown in accordance with the present invention. In this example, the azimuth compressed data {$s_{k,m}$} 1102 is multiplied 1104 by a NPPE-1 error correction value ("$C_m^{NPPE-1}$") 1106 and concatenated into the composite data $s_{k,m}=s_{k,m}C_m^{NPPE-1}$ 1108. Initially, the value of $C_m^{NPPE-1}$ 1106 is equal to 1. Window weights are applied to the concatenated data of the composite signal in the frequency range and an FFT is applied in functional block 1110. The process then determines the IQM from the processed two-dimensional image, where the IQM may be $M_4$ (described by equation #2) in functional block 1112. If the minimum IQM is not reached (in decision block 1114), the process searches (in function block 1116) for the optimum coefficients of the Legendre polynomials to determine the minimum IQM in the error model utilizing the BFGS method. Specifically, the process searches for difference values of the coefficients ("$\Delta a_{i,m}$") and updates the coefficients ("$a_{i,m}$") by applying the difference values to the earlier coefficient, i.e., $a_{i,m}$=+$\Delta a_{i,m}$. The updated coefficients are utilized, in functional block 1118, to determine the NPPE-1 phase error per the earlier described expression $$\Phi_m^{NPPE-1} = \sum_{i=2}^{O_{nppe}} a_{i,m} P_i(\hat{k}).$$

The $C_m^{NPPE-1}$ is then updated by the relationship $C_m^{NPPE-1}$=exp(j$\Phi_m^{NPPE-1}$) and the new $C_m^{NPPE-1}$ 1106 is multiplied 1104 against the azimuth compressed data $\{s_{k,m}\}$ 1102 and functional flow process repeats until the minimum IQM is reached (in decision block 1114), the process then produces the optimized coefficient values 1120.

2. NPPE-2 Calibration

Although constant and linear phase errors do not affect image quality within each step they do cause phase discontinuities at step boundaries in the composite signal and therefore the image quality is degraded if they are not estimated and corrected prior to range compression. Since constant and linear phase errors do not affect the image quality, they cannot be estimated by observing changes in IQM in each step. An approach to estimate constant and linear phase errors is based on IQM of the image formed from the composite signal of two consecutive frequency steps. Applying a constant and a linear phase to the second half of the composite signal that comes from the second step of the pairing leads to changes in the quality of the image formed from the composite signal with the modified second half. In principle, the best image quality is obtained when the phase of the second segment is aligned to that of the first one with the same phase slope and no phase jump at the boundary of data from two steps.

The NPPE-2 calibration processing begins by taking data from the first two steps (PPE and NPPE-1 calibration) after the correction of the non-periodic phase error of order higher than one in the NPPE-1 calibration. The process then sets a phase expression with constant and linear phase terms that have the length equal to the number of samples in the second step. The phase is then applied to the data from the second step, the composite signal is generated from the two steps, and a Fourier transform is performed with a proper window function to produce an image. The process then searches for the optimum coefficients of the constant and first-order phase terms that lead to the minimum IQM of the formed image. This process of parameter search is a multidimensional optimization problem as it was in the PPE and NPPE-1 processing and thus may be accomplished by the BFBS. Next, the process updates the second half of the concatenated data by applying the phase (calculated using the optimum coefficients) to the initial data from the second step. This process is then repeated through the pairing of consecutive steps for the rest of steps. More specifically, the process takes the updated second step data with the modified phase and the new third step data, performs an optimization process and then updates the third step data as was done for second step in previous pairing with the first step. This process is repeated until the pairing up to the last step is completed. It should be noted that the phase of the first step data (that is presumed approximately linear after the processing for PPE and NPPE-1) is used as the reference to get the phase of all the other steps aligned to.

Figure 12:
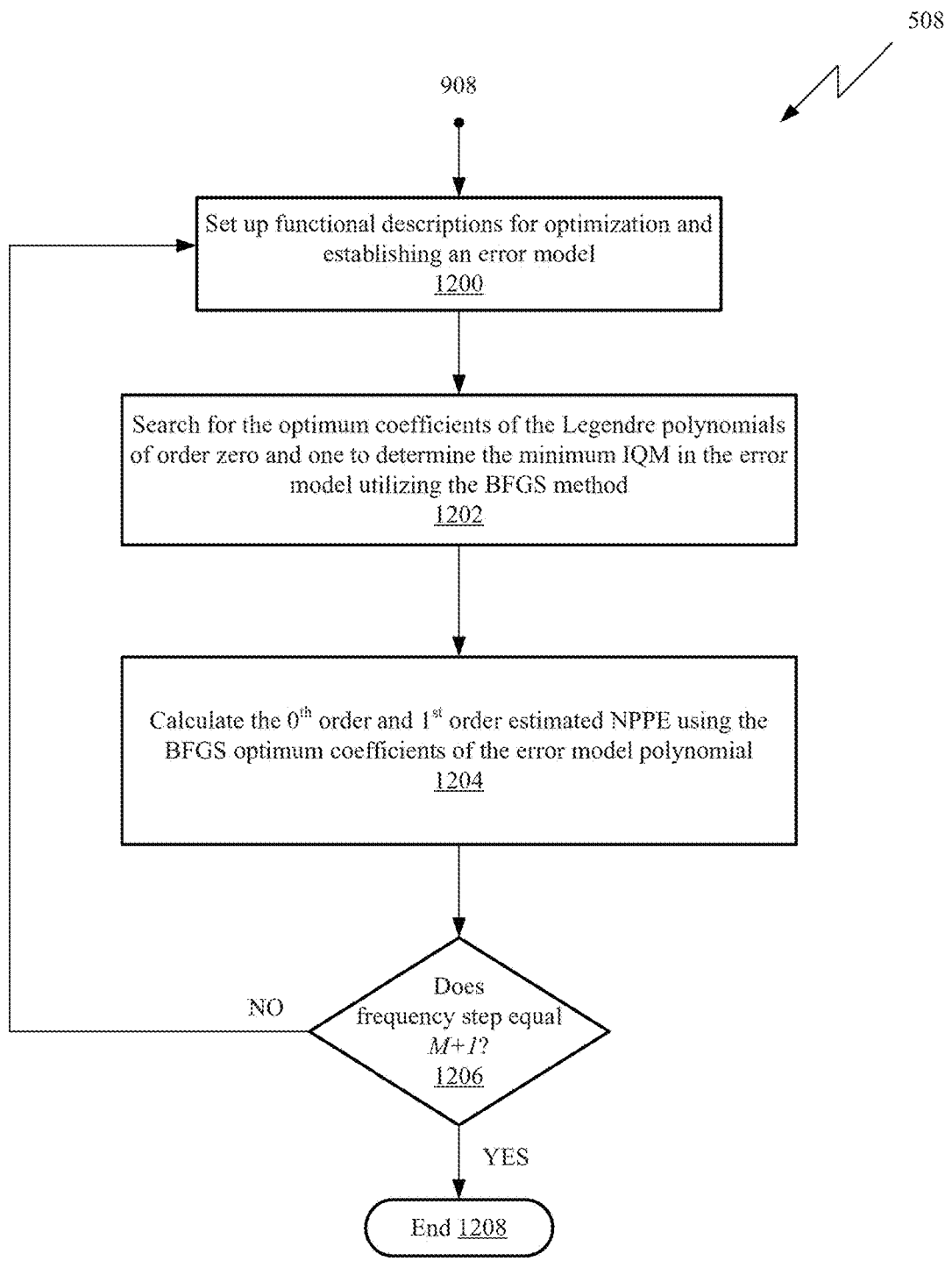
FIG. 12 is a flowchart of an example of implementation of the sub-method for preforming the NPPE-2 calibration shown in FIG. 5 in accordance with the present invention.

To better illustrate this process, the third sub-method (the NPPE-2 calibration 508 in FIG. 5) of the method performed by the RCP in determining the phase error is described in FIG. 12. In FIG. 12, a flowchart of an example of implementation of the sub-method for preforming the NPPE-2 calibration 508 is shown in accordance with the present invention. The process 908 starts by receiving the output data from NPPE-1 processing after correcting NPPE-1 of order two through $O_{nppe}$. This two-dimensional data has the dimension of spatial azimuth and range frequency. Then functional descriptions are set up for optimization and an error model is established in step 1200. This, step 1200, may include multiple sub-steps that will be described in FIG. 13. The process, in step 1202, then searches for the optimum coefficients of the Legendre polynomials of order zero and one to determine the minimum IQM in the error model utilizing the BFGS method. Then, in step 1204, the process calculates the $0^{th}$ order and $1^{st}$ order estimated NPPE-2 using the optimum coefficients of the error model polynomial optimized by the BFGS. The process between steps 1200 and 1204 is repeated for the compensation of the $0^{th}$ and $1^{st}$ order phase error for all steps (i.e., through M) except the first one from the concatenated data of two consecutive steps. Once all M steps have been processed (except for the first one from the concatenated data of two consecutive steps), the decision step 1206 (determines that loop value is equal to M+1) produces the resulting NPPE-2 corrected data.

Figure 13:
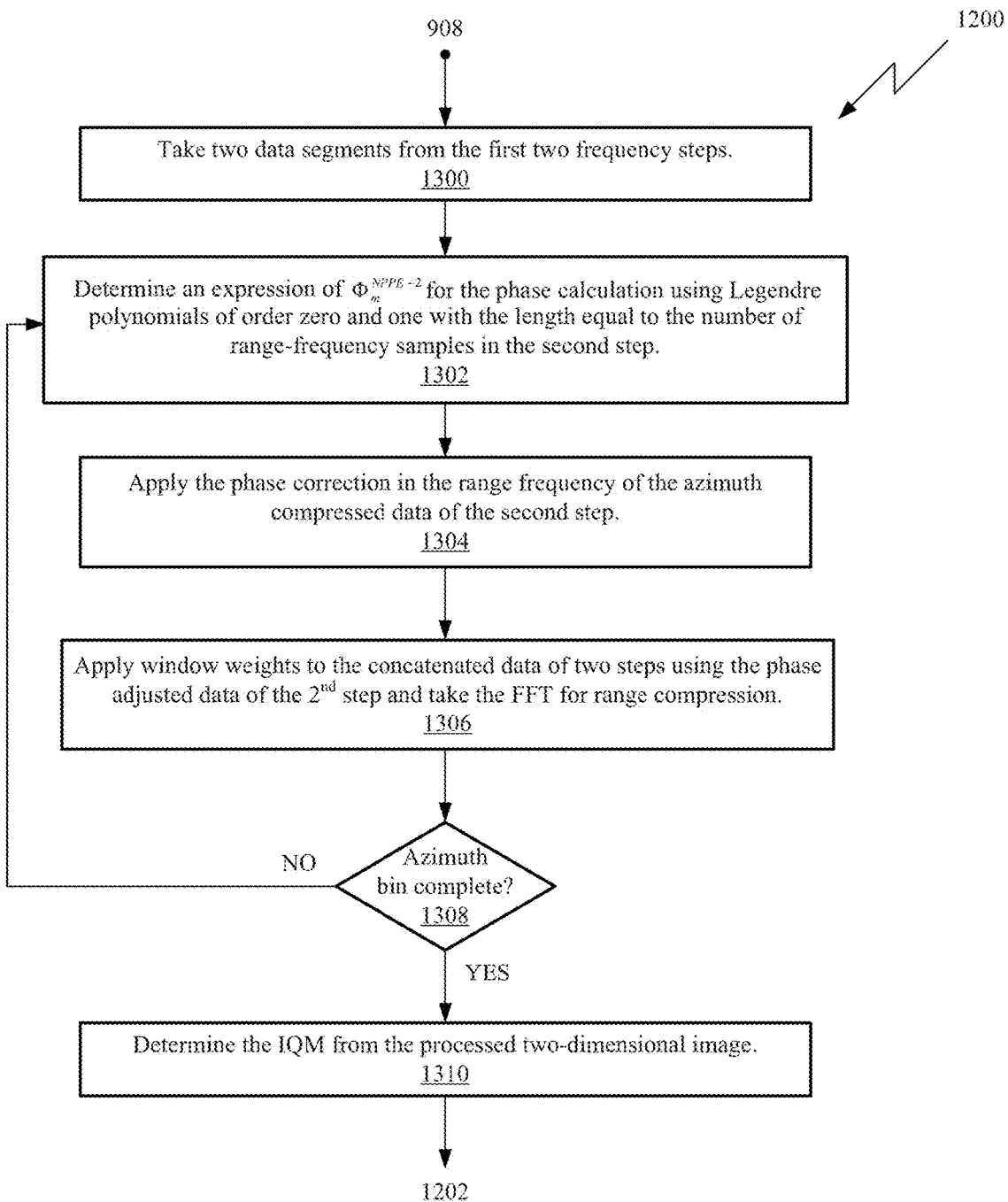
FIG. 13 is a flowchart of an example of an implementation of the sub-process for setting up the functional descriptions show in FIG. 12 in accordance with the present invention.

In FIG. 13, a flowchart of an example of an implementation of the sub-process for setting up the functional descriptions of step 1200 is shown in accordance with the present invention. The process receives the NPPE-1 corrected data for M frequency steps after NPPE-1 processing from step 908 and, in step 1300, takes two data segments from the first two frequency steps. Then, in step 1302, it determines an expression of $\Phi_m^{NPPE-2}$ for the phase calculation using Legendre polynomials of order zero and one with the length equal to the number of range-frequency samples in the second step. The process, in step 1304, then applies the correction phase in the range frequency of the azimuth compressed data of the second step. The process, in step 1306, then applies window weights to the concatenated data of two using the phase adjusted data of the $2^{nd}$ step and take the FFT for range compression. The process then determines if all the azimuth bins have been processed, in decision step 1308, if not the process repeats steps 1302, 1304, and 1306 until all the azimuth bins have been processed. If all the azimuth bins have been processed, the process, in step 1310, then determines the IQM from the processed two-dimensional image, where the IQM may be $M_E$ (described by equation #1) or $M_4$ (described by equation #2). The information is then passed to step 1202 which searches for the optimum coefficients of the Legendre polynomials of order zero and one to determine the minimum IQM in the error model utilizing the BFGS method.

Figure 14:
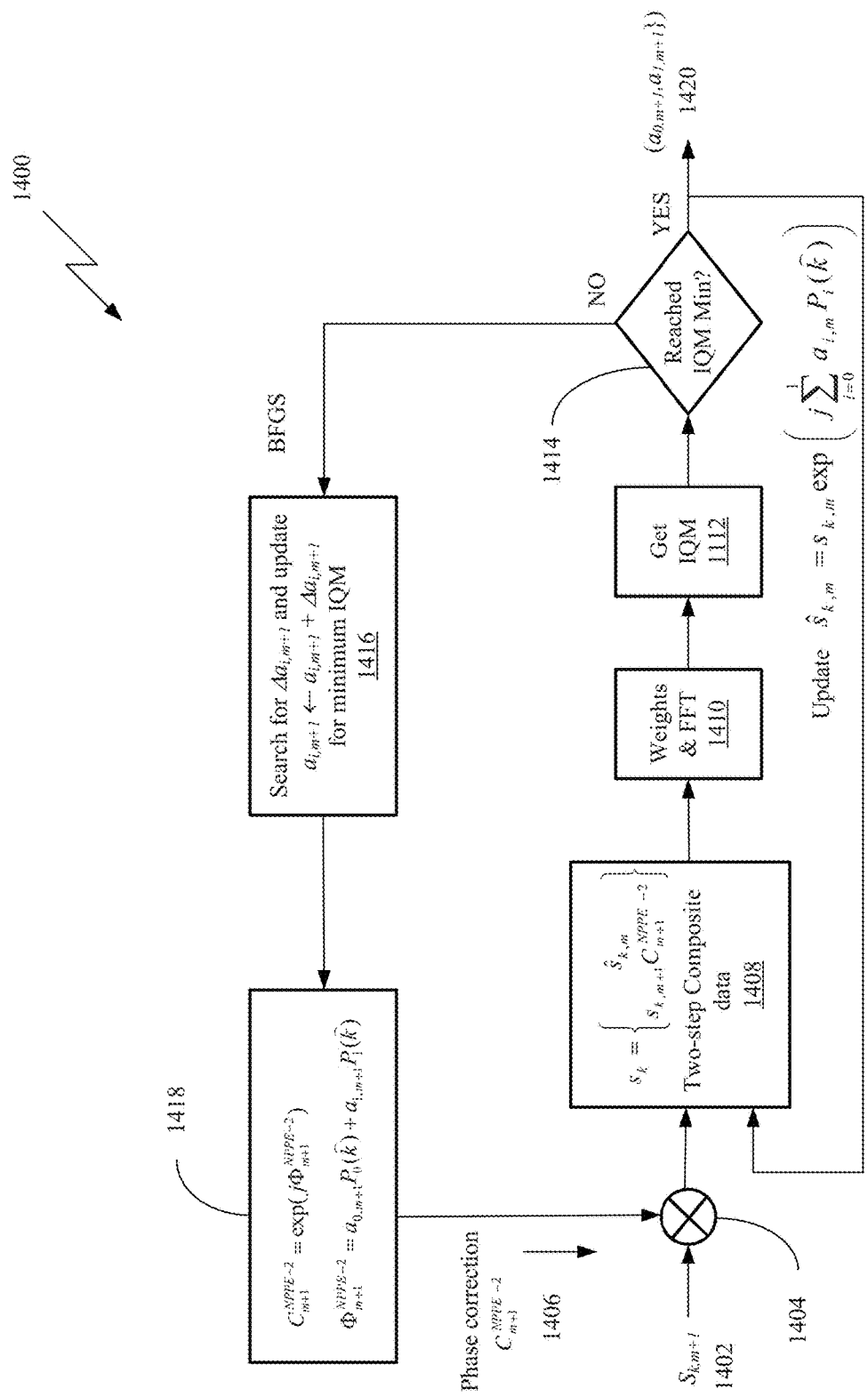
FIG. 14 is a functional flow diagram describing the process described in FIGS. 12 and 13 for the estimation of the NPPE-2 in accordance with the present invention.

Turning to FIG. 14, a functional flow diagram 1400 is shown further describing the process described earlier by the flowcharts shown in FIGS. 12 and 13 for the estimation of the NPPE-2 is shown in accordance with the present invention. The functional flow shows NPPE-2 processing by paring two steps with $\hat{s}_{k,1}=s_{k,1}$.

In this example, the azimuth compressed data $s_{k,m+1}$ 1402 is multiplied 1404 by a NPPE-2 error correction value ("$C_{m+1}^{NPPE-2}$") 1406 with the starting index value of m=1 and concatenated into the composite data $s_k$ 1408. Initially, the value of $C_{m+1}^{NPPE-2}$ 1406 is equal to 1. Window weights are applied to the concatenated data of the composite signal in the frequency range and an FFT is applied in functional block 1410. The process then determines the IQM from the processed two-dimensional image, where the IQM may be $M_4$ $M_E$ (described by equation #1) or $M_4$ (described by equation #2) in functional block 1412. If the minimum IQM is not reached (in decision block 1414), the process searches (in function block 1416) for the optimum coefficients of the Legendre polynomials to determine the minimum IQM in the error model utilizing the BFGS method. Specifically, the process searches for difference values of the coefficients ("$\Delta a_{i,m+1}$") and updates the coefficients ("$a_{i,m+1}$") by applying the difference values to the earlier coefficient, i.e., $a_{i,m+1}=a_{i,m+1}+\Delta a_{i,m+1}$. The updated coefficients are utilized, in functional block 1418, to determine the NPPE-2 phase error per the expression $$\Phi_{m+}^{NPPE-2}=a_{0,m+1}P_0(\hat{k})+a_{1,m+1}P_1(\hat{k}).$$

The $C_{m+1}^{NPPE-2}$ is then updated by the relationship $C_{m+1}^{NPPE-2}=\exp(j\Phi_{m+1}^{NPPE-2})$ and the new $C_{m+1}^{NPPE-2}$ 1406 is multiplied 1404 against the azimuth compressed data $s_{k,m+1}$ 1402 and functional flow process repeats until the minimum IQM is reached (in decision block 1414), the process then produces the optimized coefficient values $(a_{0,m+1},a_{1,m+1})$ 1420.

It is noted that in this example, the composite signal 1408 is a two-step composite signal and $$s_k = \begin{Bmatrix} \hat{s}_{k,m} \\ s_{k,m+1}C_{m+1}^{NPPE-2} \end{Bmatrix},$$

where $$\hat{s}_{k,m} = s_{k,m}\exp\left(j\sum_{i=0}^{1} a_{i,m}P_i(\hat{k})\right).$$

Once the minimum IQM values are reached in, decision block 1414, $\hat{s}_{k,m}$ is updated and passed to the two-step composite functional block 1408 to produce an updated composite data.

Figure 15:
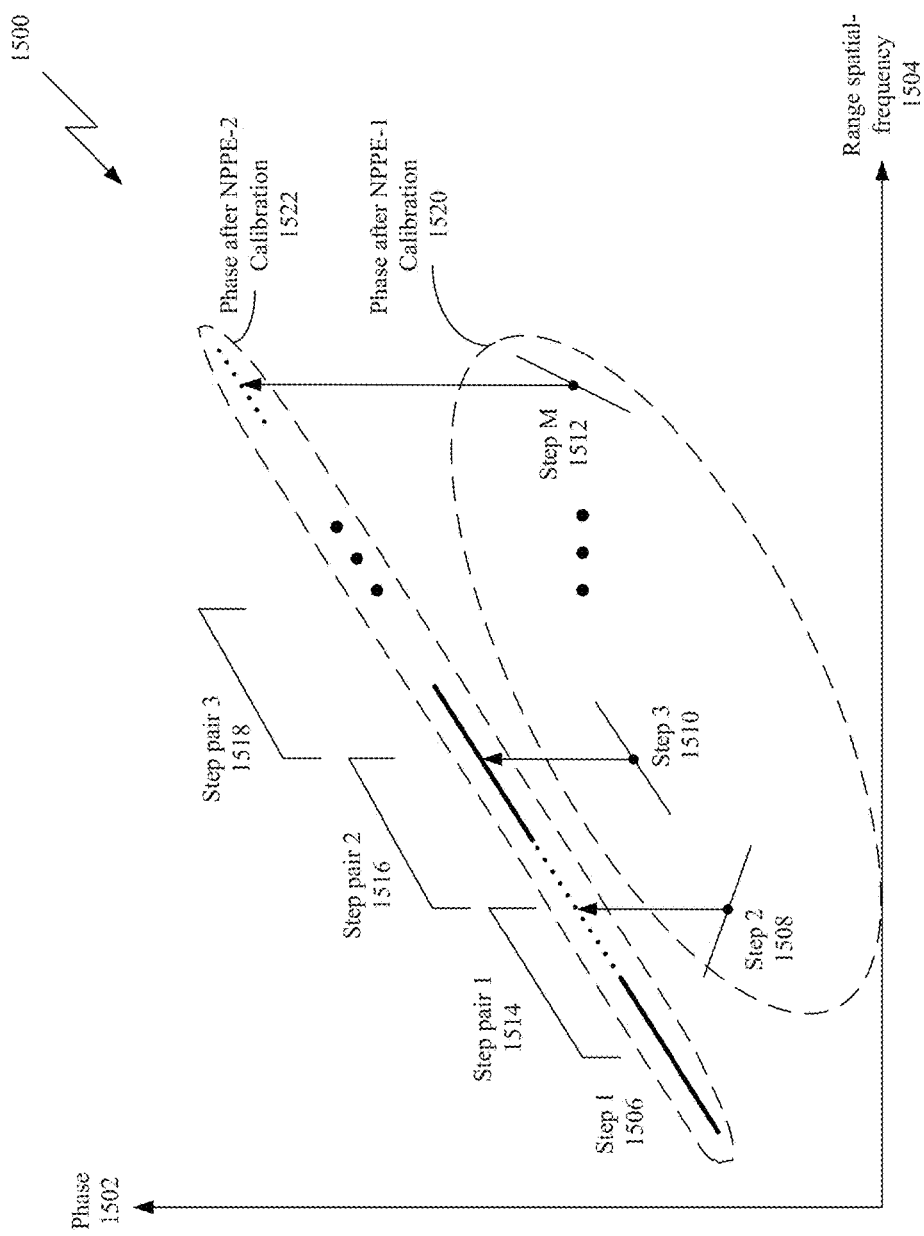
FIG. 15 is a plot of an example of implementation of phase adjustment process in accordance with the present invention.

The last part of the NPPE-2 calibration process adjusts the constant and linear phase of all the steps to align them to the first step. Specifically, the phase of the input data of all the steps, except the first one, is adjusted to align to the phase of the first step. As such, the final data after all phase error compensation has a linear phase extending from the first step to the last step in data. In FIG. 15, a plot 1500 of an example of implementation of phase adjustment process is shown in accordance with the present invention. The plot 1500 shows M example steps plotted in phase 1502 versus range spatial-frequency 1504. Four example steps (1506, 1508, 1510, and 1512) are shown at different phase values. Additionally, three step pairs (1514, 1516, and 1518) are also shown. In this example, the first step pair 1514 is between step one 1506 and step two 1508. The second step pair 1516 is between step two 1508 and step three 1510. The third step pair 1518 is between step three 1510 and step four (not shown). The number of step pairs would include all the step pair up to step M-1 to and step M 1512. In this example, steps two 1508, step three 1510, through step M 1512 are shown originally in a group 1520 of phases that correspond to the phase values after the NPPE-1 calibration but before NPPE-2 calibration. Once the data is processed by the NPPE-2 calibration the phases of all the steps (1506, 1508, 1510, and 1512) in a new group 1522 of phases that linear.

It should be noted that if the residual phase error of the first step has steep linear phase after the NPPE-1 function, there may be undesirable image shift caused by the big phase slope of the first step. A way to avoid this undesirable image shift is to use an averaged phase adjustment at all the steps. To do this the process may denote the optimized coefficients of the $0^{th}$ and $1^{st}$ order Legendre polynomials that are obtained by NPPE-2 processing with $a_{0,m}$ and $a_{1,m}$ for step m. Then the phase that is applied to the data in step m is calculated by $$\Phi_m^{NNPE-2} = \sum_{i=0}^{1} a_i P_i(\hat{k}) \text{ for } -1 \le k \le 1 \text{ and } 2 \le m \le M.$$

Figure 16:
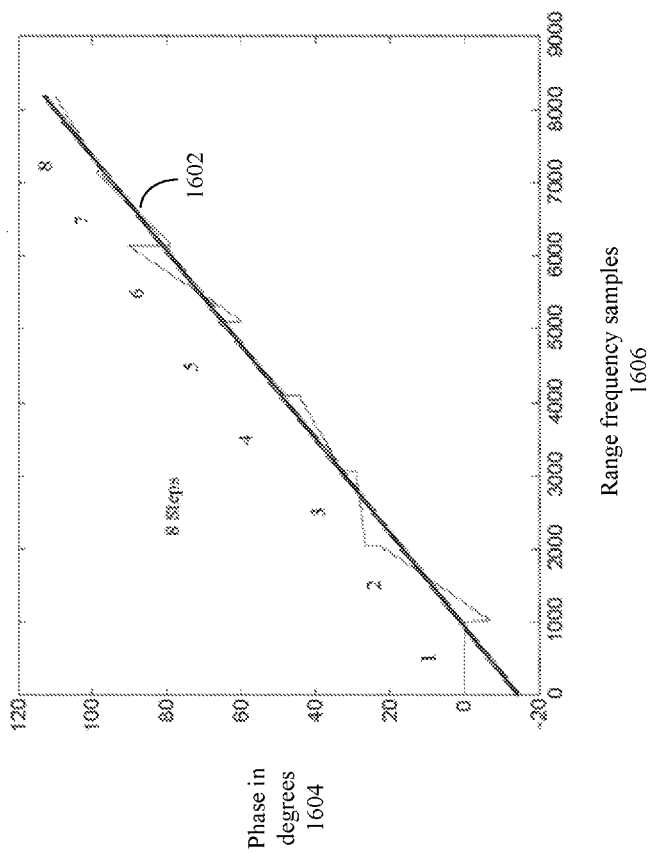
FIG. 16 is a plot of 8 steps that have been curve fitted and plotted in phase versus range frequency samples.

Then, the process is to concatenate these optimum linear phase adjustments from step one through M as $\Phi^{NPPE-2}=[\Phi_1^{NPPE-2}\Phi_2^{NPPE-2}\ldots\Phi_M^{NPPE-2}]$ with $\Phi_1^{NPPE-2}=0$. Next, the process performs a curve fit with the $1^{st}$ order polynomial to eliminate the global linear phase in the range-frequency samples after NPPE-2 processing. Using this process, a curve fit example with 8 steps is shown in plot 1600 of FIG. 16 with the global linear phase denoted by $\Phi_1^G=a_0+a_1k$ using the curve fit coefficients $a_0$ and $a_1$. The plot 1600 shows all 8 steps 1602 plotted in phase 1604 versus range frequency samples 1606.

As an example, to help illustrate the functioning of three processing stages, a test signal with an arbitrarily generated phase error that includes PPE and NPPE of order five may be applied to one-dimensional data to show the performance of presently described method with intermediate results shown after each stage of phase error calibration. The results are shown in FIGS. 17A through 17D.

FIG. 17A shows a plot 1700 of the initial input phase error as a function of phase 1702 (in degrees) versus range frequency samples 1704. FIGS. 17B through 17D show the residual phase errors after the calibration processing the PPE, NPPE-1 and NPPE-2, respectively. All three plots show the residual phase errors as functions of phase 1702 (in degrees) versus range frequency samples 1704. As such, in FIG. 17B, a plot 1706 of the residual phase error after PPE calibration of orders one through five is shown. In FIG. 17C, a plot 1708 of the residual phase error after NPPE-1 calibration of orders two through five is shown. Finally, in FIG. 17D, a plot 1710 of the residual phase error after NPPE-2 calibration of order 0 and one is shown. As illustrated in FIG. 17D, the residual linear phase 1710 is a result after the NPPE-2 calibration and this residual linear phase 1710 may cause an image shift.

Figure 18:
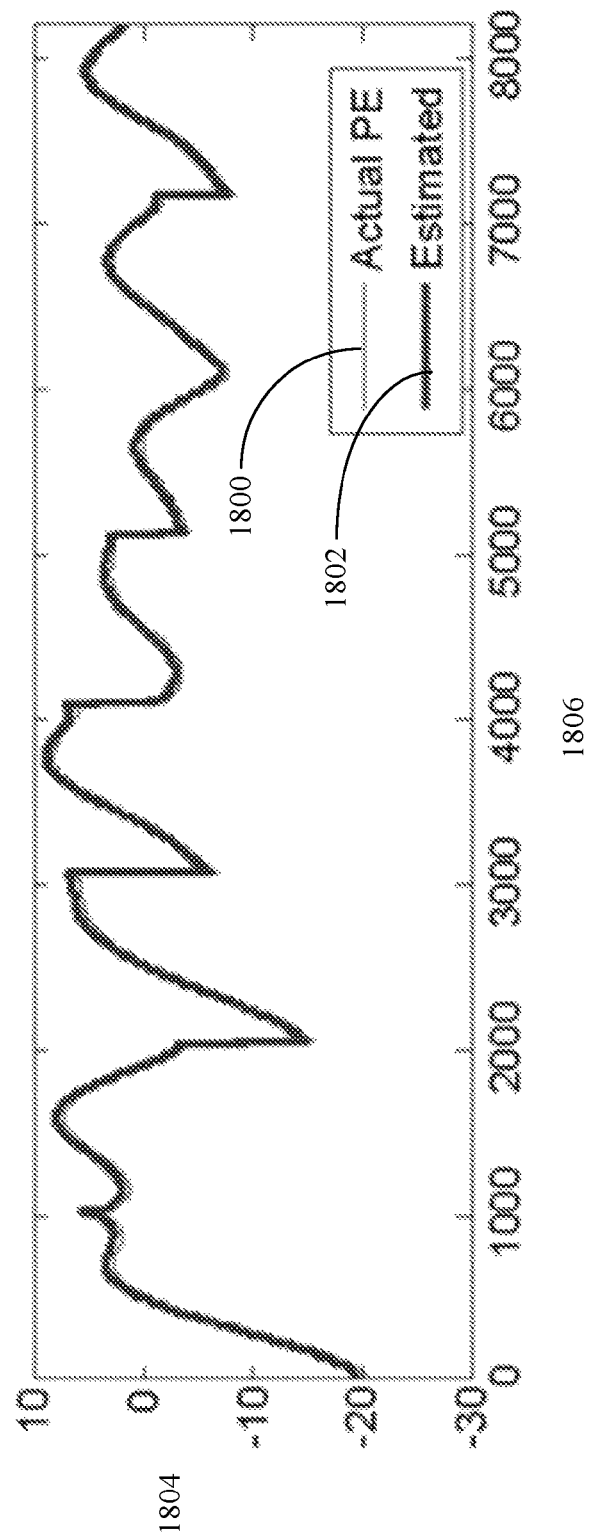
FIG. 18 shows two plots and of total phase error as functions of phase (in degrees) versus range in frequency samples, where the first plot is the actual phase error and the second plot is the estimated phase error.

Adjusting the linear phase of the composite data based on the presently described process of linear fitting the estimated phase changes from all steps during NPPE-2 processing produces a much smaller difference of linear phase components between the actual and the estimated values as shown in FIG. 18. In FIG. 18, two plots 1800 and 1802 of total phase error are shown as functions of phase 1804 (in degrees) versus range in frequency samples 1806, where the first plot 1800 is the actual phase error and the second plot 1802 is the estimated phase error. From FIG. 18, it is appreciated that there is a high agreement between the two plots 1800 and 1802. As such, utilizing the disclosed methods allows for the accurate estimation of the phase jumps between steps as well as high order phase error.

The total estimated phase error is the sum of estimates through three stages of calibration and the global linear phase adjustment as expressed in the following $$\Phi_{Est}=[\Phi_1^{3^{rd}Stage}\Phi_2^{3^{rd}Stage}\ldots\Phi_M^{3^{rd}Stage}]-\Phi_1^G$$

where $$\Phi_m^{3^{rd}Stage}=\Phi^{PPE}+\Phi_m^{NPPE-1}+\Phi_m^{NPPE-2}, m=1,2,\ldots,M.$$

These adjustments are applied to the range-frequency samples of the phase history data for each azimuth bin.

Figure 19:
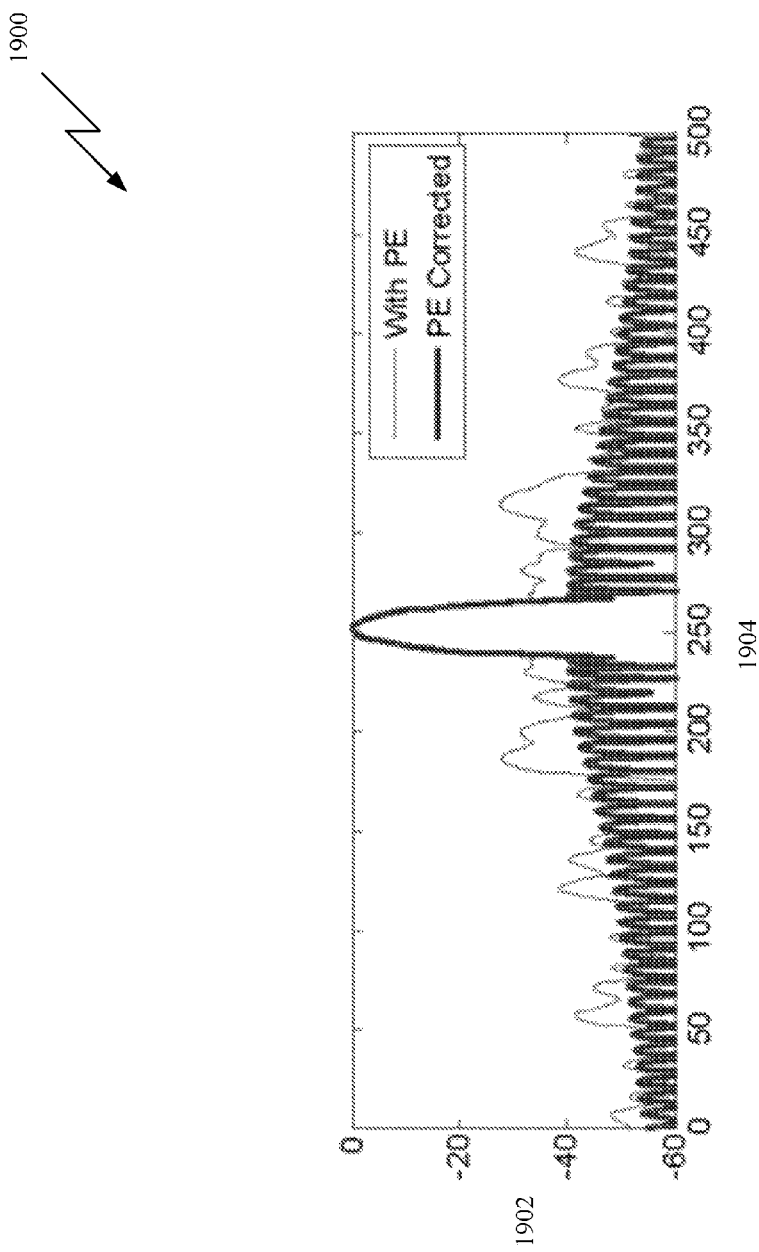
FIG. 19 is a plot of an impulse response with −40 dB Taylor weights as a function of decibels versus range in frequency samples.

Utilizing the disclosed methods allows for improvement in the impulse response of the signal. As an example, in FIG. 19, a plot 1900 of an impulse response with −40 dB Taylor weights is shown as a function of decibels 1902 versus range in frequency samples 1904.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A Radar Calibration Processor ("RCP") for calibrating the phase of a stepped-chirp signal utilized by a synthetic aperture radar ("SAR"), the RCP comprising:
   a first non-periodic phase error ("NPPE") calibrator;
   a second NPPE calibrator; and
   a periodic phase error ("PPE") calibrator, wherein the PPE calibrator is in signal communication with the first NPPE calibrator,
   wherein the first NPPE calibrator is in signal communication with the second NPPE calibrator,
   wherein the PPE calibrator is configured to receive video phase history ("VPH") data from the SAR and, in response, produces PPE calibrated data from the VPH data, and
   wherein the VPH data includes a plurality of steps within a stepped-chirped waveform and a range frequency.

2. The RCP of claim 1, wherein the PPE calibrator is further configured to
   perform an azimuth compression on the VPH data to produce azimuth compressed input data,
   concatenate the azimuth compressed input data into concatenated data,
   define functional descriptions for optimization of the azimuth compressed input data,
   establish an error model based on the functional descriptions,
   search for optimum coefficients of one or more Legendre polynomials to determine a minimum image quality metric ("IQM") for the error model,
   determine an estimated PPE using the optimum coefficients of the error model, and
   apply the estimated PPE to the azimuth compressed input data.

3. The RCP of claim 2, wherein the configuration of the PPE calibrator to define the functional descriptions for optimization includes (a) determining an expression for a PPE phase error of order $O_{ppe}$ starting from an order one for a phase calculation using Legendre polynomials with a length equal to a number of samples in a step, of the plurality of steps, of the stepped-chirp waveform, wherein the number of samples include a first sample and a last sample, (b) applying a phase correction for the PPE phase error to the azimuth compressed data of all the steps in the range frequency, (c) applying window weights to the concatenated data in the frequency range, (d) applying a fast Fourier transform ("FFT") on the concatenated data for range compression, (e) repeating the steps (b) through (d) from the first sample to the last sample to produce a processed two-dimensional image, and (f) determining the IQM from the processed two-dimensional image.

4. The RCP of claim 1, wherein the first NPPE ("NPPE-1") calibrator is configured to receive the PPE calibrated data having M frequency steps and, in response, produces NPPE-1 calibrated data, which has been calibrated for type-1 NPPE.

5. The RCP of claim 4, wherein the NPPE-1 calibrator is configured to
   (a) define functional descriptions for optimization and establishing an error model for a NPPE-1 phase error,
   (b) search for optimum coefficients of Legendre polynomials to determine a minimum IQM in the error model for the NPPE-1 phase error utilizing a Broyden-Fletcher-Goldfarb-Shanno ("BFGS") algorithm,
   (c) determine an estimated NPPE-1 phase error using the optimum coefficients of the error model for a NPPE-1 phase error,
   (d) apply the estimated NPPE to the azimuth compressed input data, wherein the NPPE-1 phase error is compensated for the order two through $O_{nppe}$, and
   (e) repeat steps (a) through (d) until all M frequency steps have been processed.

6. The RCP of claim 5, wherein the configuration of the NPPE-1 calibrator to define the functional descriptions for optimization includes
   (a) determining an expression of the NPPE-1 phase error of order $O_{ppe}$ starting from order two for a phase calculation using Legendre polynomials with the length equal to a number of samples in a step, of the plurality of steps, of the stepped-chirp waveform, wherein the number of samples include a first sample and a last sample,
   (b) applying the phase correction to the azimuth compressed data of a step in the range frequency,
   (c) applying window weights to the concatenated data in the frequency range,
   (d) applying a fast Fourier transform ("FFT") on the concatenated data for range compression,
   (e) repeating the steps (b) through (d) from the first sample to the last sample to produce a processed two-dimensional image, and
   (f) determining the IQM from the processed two-dimensional image.

7. The RCP of claim 4, wherein the second NPPE ("NPPE-2") calibrator is configured to receive the NPPE-1 calibrated data and, in response, produces NPPE-2 calibrated data, which has been calibrated for type-2 NPPE.

8. The RCP of claim 7, wherein the NPPE-2 calibrator is configured to (a) define functional descriptions for optimization and establishing an error model for a NPPE-2 phase error,
(b) search for optimum coefficients of Legendre polynomials of order zero and order one to determine a minimum IQM in the error model for the NPPE-2 phase error utilizing a Broyden-Fletcher-Goldfarb-Shanno ("BFGS") algorithm,
(c) determine an 0order and firstorder estimated NPPE phase error using the optimum coefficients of the error model for the NPPE-2 phase error,
(d) repeat steps (a) through (c) until all M frequency steps have been processed.

9. The RCP of claim 8, wherein the configuration of the NPPE-2 calibrator to define the functional descriptions for optimization includes
(a) taking two data segments from a first and a second frequency steps of the M frequency steps,
(b) determining an expression of the NPPE-2 phase error for a phase correction using Legendre polynomials of order zero and order one with a length equal to the number of range frequency samples in the second step,
(c) applying the phase correction in the range frequency of the azimuth compressed data of the second step,
(d) applying window weights to a concatenated data of the first and second steps using the phase adjusted data of the second step,
(e) applying a fast Fourier transform ("FFT") on the concatenated data for range compression,
(f) repeating the steps (b) through (e) from the first sample to the last sample to produce a processed two-dimensional image, and
(g) determining the IQM from the processed two-dimensional image.

10. The RCP of claim 8, wherein the RCP is configured to adjust constant and linear phases of all the M-1 steps in order to align them to the first step.

11. The RCP of claim 10, further including an antenna gain calibrator.

12. A method for calibrating the phase of a stepped-chirp signal utilized by a synthetic aperture radar ("SAR"), the method comprising:
estimating a first non-periodic phase error ("NPPE");
estimating for a second NPPE calibration after the first NPPE ("NPPE-1") has been estimated; and
estimating a periodic phase error ("PPE"),
wherein the PPE is estimate prior to estimating the first NPPE,
wherein estimating the PPE includes
receiving video phase history ("VPH") data from the SAR and
producing a PPE calibrated data from the VPH data in response to receiving the VPH data and
wherein the VPH data includes a plurality of steps within a stepped-chirped waveform and a range frequency.

13. The method of claim 12, wherein estimating the PPE further includes
performing an azimuth compression on the VPH data to produce azimuth compressed input data,
concatenating the azimuth compressed input data into concatenated data,
defining functional descriptions for optimization of the azimuth compressed input data,
establishing an error model based on the functional descriptions,
searching for optimum coefficients of one or more Legendre polynomials to determine a minimum image quality metric ("IQM") for the error model,
determining an estimated PPE using the optimum coefficients of the error model, and
applying the estimated PPE to the azimuth compressed input data.

14. The method of claim 13, wherein defining functional descriptions for optimization includes
(a) determining an expression for a PPE phase error of order $O_{ppe}$ starting from an order one for a phase calculation using Legendre polynomials with a length equal to a number of samples in a step, of the plurality of steps, of the stepped-chirp waveform, wherein the number of samples include a first sample and a last sample,
(b) applying a phase correction for the PPE phase error to the azimuth compressed data of all the steps in the range frequency,
(c) applying window weights to the concatenated data in the frequency range,
(d) applying a fast Fourier transform ("FFT") on the concatenated data for range compression,
(e) repeating the steps (b) through (d) from the first sample to the last sample to produce a processed two-dimensional image, and
(f) determining the IQM from the processed two-dimensional image.

15. The method of claim 12, wherein estimating the NPPE-1 phase error includes
receiving the PPE calibrated data having M frequency steps and
producing NPPE-1 calibrated data, which has been calibrated for type-1 NPPE, in response to receiving the PPE calibrated data.

16. The method of claim 15, wherein the estimating the NPPE-1 phase error further includes
(a) defining functional descriptions for optimization and establishing an error model for a NPPE-1 phase error,
(b) searching for optimum coefficients of Legendre polynomials to determine a minimum IQM in the error model for the NPPE-1 phase error utilizing a Broyden-Fletcher-Goldfarb-Shanno ("BFGS") algorithm,
(c) determining an estimated NPPE-1 phase error using the optimum coefficients of the error model for a NPPE-1 phase error,
(d) applying the estimated NPPE to the azimuth compressed input data, wherein the NPPE-1 phase error is compensated for the order two through $O_{nppe}$, and
(e) repeating steps (a) through (d) until all M frequency steps have been processed.

17. The method of claim 16, wherein defining functional descriptions for optimization includes
(a) determining an expression of the NPPE-1 phase error of order $O_{ppe}$ starting from order two for a phase calculation using Legendre polynomials with the length equal to a number of samples in a step, of the plurality of steps, of the stepped-chirp waveform, wherein the number of samples include a first sample and a last sample,
(b) applying the phase correction to the azimuth compressed data of a step in the range frequency,
(c) applying window weights to the concatenated data in the frequency range,
(d) applying a fast Fourier transform ("FFT") on the concatenated data for range compression,
(e) repeating the steps (b) through (d) from the first sample to the last sample to produce a processed two-dimensional image, and (f) determining the IQM from the processed two-dimensional image.

18. The method of claim 12, wherein estimating the NPPE-2 phase error includes
   receiving the NPPE-1 calibrated data and
   producing NPPE-2 calibrated data, which has been calibrated for type-2 NPPE, in response to receiving the NPPE-1 calibrated data.

19. The method of claim 18, wherein estimating the NPPE-2 phase error further includes
   (a) defining functional descriptions for optimization and establishing an error model for a NPPE-2 phase error,
   (b) searching for optimum coefficients of Legendre polynomials of order zero and order one to determine a minimum IQM in the error model for the NPPE-2 phase error utilizing a Broyden-Fletcher-Goldfarb-Shanno ("BFGS") algorithm,
   (c) determining an 0 order and first order estimated NPPE phase error using the optimum coefficients of the error model for the NPPE-2 phase error,
   (d) repeating steps (a) through (c) until all M frequency steps have been processed.

20. The method of claim 19, wherein defining functional descriptions for optimization includes
   (a) taking two data segments from a first and a second frequency steps of the M frequency steps,
   (b) determining an expression of the NPPE-2 phase error for a phase correction using Legendre polynomials of order zero and order one with a length equal to the number of range frequency samples in the second step,
   (c) applying the phase correction in the range frequency of the azimuth compressed data of the second step,
   (d) applying window weights to a concatenated data of the first and second steps using the phase adjusted data of the second step,
   (e) applying a fast Fourier transform ("FFT") on the concatenated data for range compression,
   (f) repeating the steps (b) through (e) from the first sample to the last sample to produce a processed two-dimensional image, and
   (g) determining the IQM from the processed two-dimensional image.

21. The method of claim 20, further including adjusting constant and linear phases of all the M steps in order to align them to the first step.

22. The method of claim 21, further including calibrating an antenna gain prior to estimating the PPE phase error.

23. A Radar Calibration Processor ("RCP") for calibrating the phase of a stepped-chirp signal utilized by a synthetic aperture radar ("SAR"), the RCP comprising:
   means for estimating a first non-periodic phase error ("NPPE");
   means for estimating for a second NPPE calibration after the first NPPE ("NPPE-1") has been estimated; and
   means for estimating a periodic phase error ("PPE"),
   wherein the PPE is estimate prior to estimating the first NPPE,
   wherein estimating the PPE includes
   receiving video phase history ("VPH") data from the SAR and
   producing a PPE calibrated data from the VPH data in response to receiving the VPH data and
   wherein the VPH data includes a plurality of steps within a stepped-chirped waveform and a range frequency.

* * * * *